(12) United States Patent
Berman et al.

(10) Patent No.: US 11,312,534 B2
(45) Date of Patent: Apr. 26, 2022

(54) MODULAR REUSABLE SHIPPING CRATE

(71) Applicant: Logistics Advanced Research Center LLC, Nashville, TN (US)

(72) Inventors: Samuel Jacob Berman, Nashville, TN (US); John Christopher Taylor, Nashville, TN (US)

(73) Assignee: LOGISTICS ADVANCED RESEARCH CENTER LLC, Nashville, TN (US)

( * ) Notice: Subject to any disclaimer, the term of this patent is extended or adjusted under 35 U.S.C. 154(b) by 0 days.

(21) Appl. No.: 17/001,603

(22) Filed: Aug. 24, 2020

(65) Prior Publication Data
US 2021/0053722 A1 Feb. 25, 2021

Related U.S. Application Data

(60) Provisional application No. 62/891,340, filed on Aug. 24, 2019, provisional application No. 63/037,981, filed on Jun. 11, 2020.

(51) Int. Cl.
*B65D 19/18* (2006.01)

(52) U.S. Cl.
CPC .... *B65D 19/18* (2013.01); *B65D 2519/00034* (2013.01); *B65D 2519/00069* (2013.01);
(Continued)

(58) Field of Classification Search
CPC ........ B65D 19/00; B65D 19/44; B65D 19/02; B65D 19/06; B65D 19/12; B65D 19/18; B65D 2519/00965; B65D 2519/0096
(Continued)

(56) References Cited

U.S. PATENT DOCUMENTS 3,133,511 A * 5/1964 Phillips .................. B65D 19/16
108/55.1
4,673,087 A * 6/1987 Webb ................. B65D 11/1873
206/600
(Continued)

FOREIGN PATENT DOCUMENTS

DE 102019116227 B3 * 9/2020 ............. B65D 19/18
FR 2654703 A1 * 5/1991 ............. B65D 19/20
(Continued)

*Primary Examiner* — Jose V Chen
(74) *Attorney, Agent, or Firm* — A. J. Bahou; Christopher T. McNeill; Waller Lansden Dortch & Davis LLP

(57) ABSTRACT

A system, method, and device for shipping, transporting, storing, and managing logistics of a variety of cargo. A crate is disclosed that allows for easy and inexpensive return shipment (reverse logistics) after use through a collapsible, interlocking system of a pallet base, foldable side wall assemblies, and a lid that can be removably connected to one another. The crate can utilize guide protrusions and corresponding guide recesses to fit the components together. The height of the crate can be increased by additional tiers of side walls. Latch assemblies can be utilized to fasten adjacent components together. The crate may include a tracking or monitoring device that can monitor one or more of humidity, temperature, tilt, impact, vibration, and variety of desired conditions. The system may include Bluetooth beacons on each of the components and a Bluetooth sensor in the monitoring device in the pallet base to monitor disassembled components.

20 Claims, 21 Drawing Sheets

(52) U.S. Cl.
CPC ............... *B65D 2519/0086* (2013.01); *B65D 2519/00174* (2013.01); *B65D 2519/00338* (2013.01); *B65D 2519/00552* (2013.01); *B65D 2519/00965* (2013.01)

(58) Field of Classification Search
USPC ................... 108/55.1, 53.1; 206/600, 386
See application file for complete search history.

(56) References Cited

U.S. PATENT DOCUMENTS

| | | | | |
|---|---|---|---|---|
| 4,944,404 | A * | 7/1990 | Mead | B65D 19/18 |
| | | | | 206/600 |
| 5,109,985 | A * | 5/1992 | Rose | B65D 19/06 |
| | | | | 206/600 |
| 5,133,460 | A * | 7/1992 | Shuert | B65D 5/4266 |
| | | | | 108/55.1 |
| 5,253,763 | A * | 10/1993 | Kirkley | B65D 19/16 |
| | | | | 206/600 |
| 5,829,595 | A * | 11/1998 | Brown | B65D 19/0018 |
| | | | | 206/600 |
| 6,032,815 | A * | 3/2000 | Elstone | B65D 25/38 |
| | | | | 206/600 |
| 6,050,410 | A * | 4/2000 | Quirion | B65D 19/20 |
| | | | | 206/386 |
| 6,105,511 | A * | 8/2000 | Bridges | H05K 7/1488 |
| | | | | 108/55.1 |
| 6,170,689 | B1 * | 1/2001 | Flesher | B65D 19/06 |
| | | | | 206/508 |
| 6,182,849 | B1 * | 2/2001 | Elstone, Sr. | B65D 19/12 |
| | | | | 206/600 |
| 6,299,011 | B1 * | 10/2001 | Rosenfeldt | B65D 19/0028 |
| | | | | 220/4.29 |
| 6,820,761 | B1 * | 11/2004 | Mouri | B65D 11/1833 |
| | | | | 206/600 |
| 7,290,663 | B2 * | 11/2007 | Deng | B65D 11/1826 |
| | | | | 206/454 |
| 8,413,831 | B2 * | 4/2013 | Nolan | B65D 21/068 |
| | | | | 220/7 |
| 8,608,003 | B2 * | 12/2013 | Uno | B65D 19/18 |
| | | | | 220/4.33 |
| 8,640,912 | B2 * | 2/2014 | Orgeldinger | B65D 11/1833 |
| | | | | 220/691 |
| 2005/0150892 | A1 * | 7/2005 | Miller | B65D 19/18 |
| | | | | 220/324 |
| 2009/0134057 | A1 * | 5/2009 | Hidalgo Vargas | |
| | | | | B65D 11/1833 |
| | | | | 206/600 |
| 2011/0017106 | A1 * | 1/2011 | Muirhead | B65D 19/38 |
| | | | | 108/57.27 |
| 2013/0048522 | A1 * | 2/2013 | Lorenz | B65D 21/083 |
| | | | | 206/386 |
| 2014/0197168 | A1 * | 7/2014 | Miller | B65D 11/1873 |
| | | | | 220/4.33 |
| 2015/0108037 | A1 * | 4/2015 | Evans | B65D 19/18 |
| | | | | 206/600 |
| 2015/0175304 | A1 * | 6/2015 | Ficker | B65D 19/18 |
| | | | | 220/4.29 |
| 2015/0217902 | A1 * | 8/2015 | Dubois | B65D 19/40 |
| | | | | 206/600 |
| 2016/0001922 | A1 * | 1/2016 | Sadykov | B65D 19/38 |
| | | | | 53/414 |
| 2019/0034863 | A1 * | 1/2019 | Winkle | B65D 19/38 |
| 2019/0135488 | A1 * | 5/2019 | Douralis | B65D 21/0217 |
| 2020/0122885 | A1 * | 4/2020 | Dent | B65D 19/18 |

FOREIGN PATENT DOCUMENTS

| | | | | |
|---|---|---|---|---|
| GB | | 2347668 A * | 9/2000 | ............ B65D 19/06 |
| WO | WO-2009121092 A1 * | | 10/2009 | ............ B65D 55/14 |

* cited by examiner

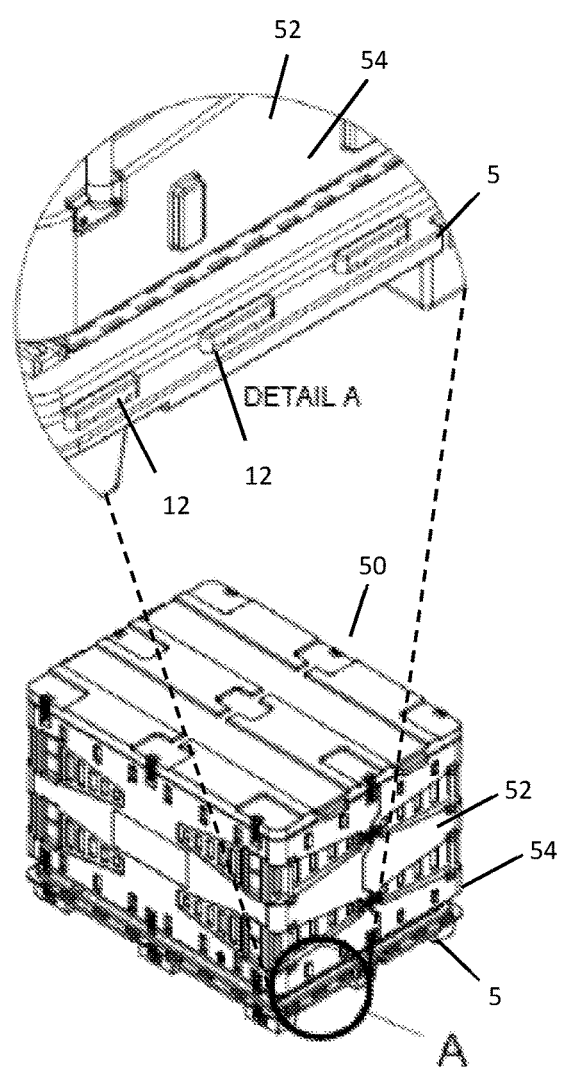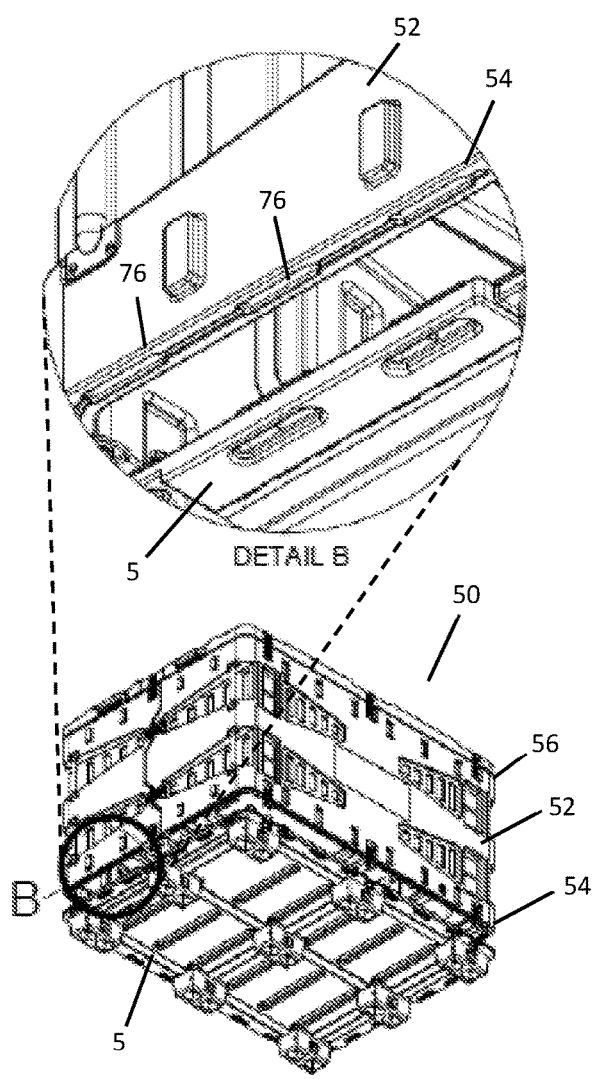
FIG. 14a                    FIG. 14b

MODULAR REUSABLE SHIPPING CRATE

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This non-provisional patent application claims priority to U.S. Provisional Patent Application No. 62/891,340, filed Aug. 24, 2019, entitled MODULAR REUSABLE SHIPPING CRATE, and U.S. Provisional Patent Application No. 63/037,981, filed Jun. 11, 2020, entitled REUSABLE SHIPPING PLATFORM FOR TRANSPORTING MULTIPLE ELECTRICAL CIRCUIT BREAKERS, both of which are hereby incorporated by reference in their entirety.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

TECHNICAL FIELD

The present invention generally relates to shipping cargo, and more particularly, to the methods, systems, and devices for transport, storage, and logistics management of a variety of cargo.

BACKGROUND

Wood shipping crates are the standard container for shipping a large of cargo. Such crates are made from heavy and bulky wooden materials. An example of cargo that is shipped in wood crates is data server racks, blades, cart-based healthcare devices, household appliances and other high-tech machines and components. Wood crates are economically inefficient, resource and energy intensive, and environmentally destructive. Despite advances in real-time asset tracking technology, wood crates typically do not contain technology that allows for condition and location monitoring. However, these crates remain the primary container used for shipping many products today. The vast majority of these wood crates are built to transport a particular product, and are used only one time before being disposed of Wood crates are also heavy and difficult to maneuver, even when empty.

What is needed then are improvements to shipping crate technologies.

SUMMARY

This Summary is provided to introduce a selection of concepts in a simplified form that are further described below in the Detailed Description below. This Summary is not intended to identify key features or essential features of the claimed subject matter, nor is it intended to be used as an aid in determining the scope of the claimed subject matter.

The present disclosure generally relates to a reusable container platform for the transport and storage of a large variety of cargo, including data server racks, blades, cart-based healthcare devices, and associated physical and electronic components. The crate can allow for easy and inexpensive return shipment (reverse logistics) through a collapsible, interlocking system that in some embodiments can reduce the unit height by more than 70% of its standard assembled shipping height and allows for return shipment volumes that are reduced by as much as 82%.

One aspect of the present disclosure is a crate including a pallet base and an enclosure frame. The enclosure frame can have a first end and second end opposite the first end, the first end of the enclosure frame removably connectable to the pallet base to define a storage volume between the pallet base and the enclosure frame, the enclosure frame having four side walls forming four corners on the enclosure frame when the first end of the enclosure frame is connected to the pallet base, each of the side walls being pivotally connected to adjacent side walls at corresponding corners of the enclosure frame. The crate can include a lid removably connectable to the second end of the enclosure frame.

Another aspect of the present disclosure is a crate including a pallet base and a pair of side wall assemblies. Each side wall assembly can include: a side wall having a first side wall end and a second side wall end; a first side wall portion pivotally connected to the first side wall end, and a second side wall portion pivotally connected to the second side wall end; wherein the first side wall portions of each side wall assembly can be removably connected to each other and the second side wall portions of each side wall assembly can be removably connected to each other to form an enclosure frame including the first side wall, the second side wall, a third side wall including the first side wall portions, and a fourth including the fourth side wall portions, the enclosure frame having a bottom end and a top end, the bottom end removably connectable to the pallet base. The crate can include a lid removably connectable to the top end of the enclosure frame.

Another aspect of the present disclosure is a method of shipping cargo comprising: at a first location, providing a crate having a pallet base, an enclosure frame, and a lid, the enclosure frame removably connected to the pallet base and the lid, the enclosure frame having one or more side walls pivotally connected to one another; placing the cargo in the crate; transporting the crate with the cargo to a desired location; unloading the cargo from the crate; removing the lid from the enclosure frame and removing the enclosure frame from the pallet base; folding the side walls of the enclosure frame onto one another to place the enclosure frame in a flat orientation; stacking the folded enclosure frame between the pallet base and the lid; and transporting the stacked crate back to the first location.

The present invention, in one embodiment, contemplates that the crate is made of plastics, metal components, rubber and other solid materials and can protect various sized cargo through a stacking modular interlocking design that utilizes guide protrusions and corresponding guide recesses or cavities to fit the components together and limit how they can move with respect to each other. The pallet, side walls and lid can be connected utilizing these guide protrusions and corresponding shaped recesses, along with multiple latch assemblies to removably connect various components of the crate together. The height of the crate can be increased by additional tiers of side walls above the pallet. A container latch is designed and used in one embodiment to fasten adjacent components to each other. The container latch is capable of fastening the side walls to each other or the pallet and the lid to the side walls. Through various accessories and inserts the container can also be used to ship a wide array of commodities including electronic equipment, machinery, dry goods and retail merchandise. The crate includes a condition and location monitoring device in a small enclosed pocket of the pallet that monitors humidity, temperature in the pallet as well as detecting tilt, impact, and vibration. The device also senses light when the crate opened as well as the geographic coordinates of the crate via a global positioning sensor (GPS) and triangulation of cell towers from a cellular chip. Remote inventorying of disassembled components can be performed utilizing Bluetooth beacons on each of the components and a Bluetooth sensor in the condition and location monitoring device in the pallet base.

It is understood that both the foregoing general description and the following detailed description are exemplary and exemplary only, and are not restrictive of the invention as claimed.

BRIEF DESCRIPTION OF THE DRAWINGS

The accompanying drawings, which are incorporated in and constitute a part of the specification, illustrate exemplary embodiments of the invention. Together with the description, they serve to explain the objects, advantages, and principles of the invention.

The drawings and sketches included with this submission are a set of engineered production plans that have been used to produce full size prototypes. The figures include a 3D image of the fully assembled unit as well as line art from the production drawings complete with specific dimensions, measurements, material call outs, thicknesses and required accessories for a completed product. The figures include the main components, which include the risers, pallet, side walls and the lid and exploded images of all requisite parts. Structural elements in the pallet system such as the riser with vibration dampeners and the supporting metal tubing of the pallet are shown. The two elements for connecting of the components include the latching system and the rectangular protrusions and the cavities that they fit into. Also included is a line art image of the unit in folded down or collapsed return shipping mode showing the inventive interlocking method incorporated into the design. In the drawings:

FIG. 11b is a detailed perspective view of the reinforcement frame of FIG. 11a.

FIG. 14a is an upper perspective view of a pallet base and side wall connection of a crate of the present disclosure that utilizes rectangular guide protrusions and corresponding rectangular guide cavities.

FIG. 14b is a lower perspective view of a pallet base and side wall connection of the crate of FIG. 14a.

DETAILED DESCRIPTION

Figure 1:
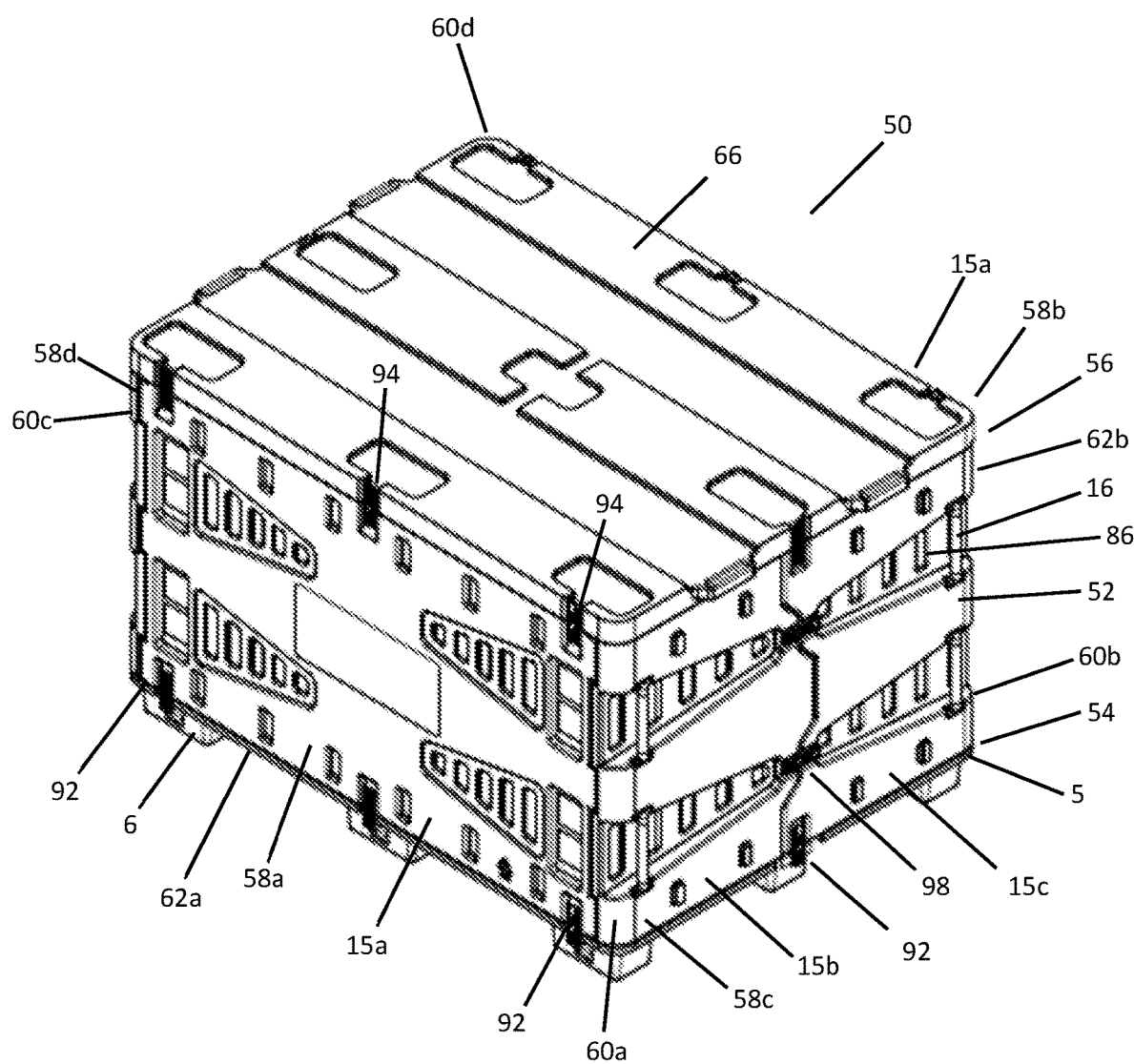
FIG. 1 is a perspective view of an exemplary single-tier crate of the present disclosure.

Reference will now be made in detail to exemplary embodiments of the invention, some aspects of which are illustrated in the accompanying drawings.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosed inventions and are not intended to limit the scope of the claims. Furthermore, there is no intention to be bound by any expressed or implied theory presented in the preceding technical field, background, summary, or the following detailed description.

In the drawings, not all reference numbers are included in each drawing, for the sake of clarity. In addition, positional terms such as "upper," "lower," "side," "top," "bottom," etc. refer to the system or components thereof when in the orientation shown in the drawing. A person of skill in the art will recognize that the system can assume different orientations when in use.

The present disclosure includes a device, system, and method for transporting cargo via a modular reusable shipping crate. Further, the present invention discloses methods, systems, and devices for transport, storage, and logistics management of a variety of cargo.

Figure 16:
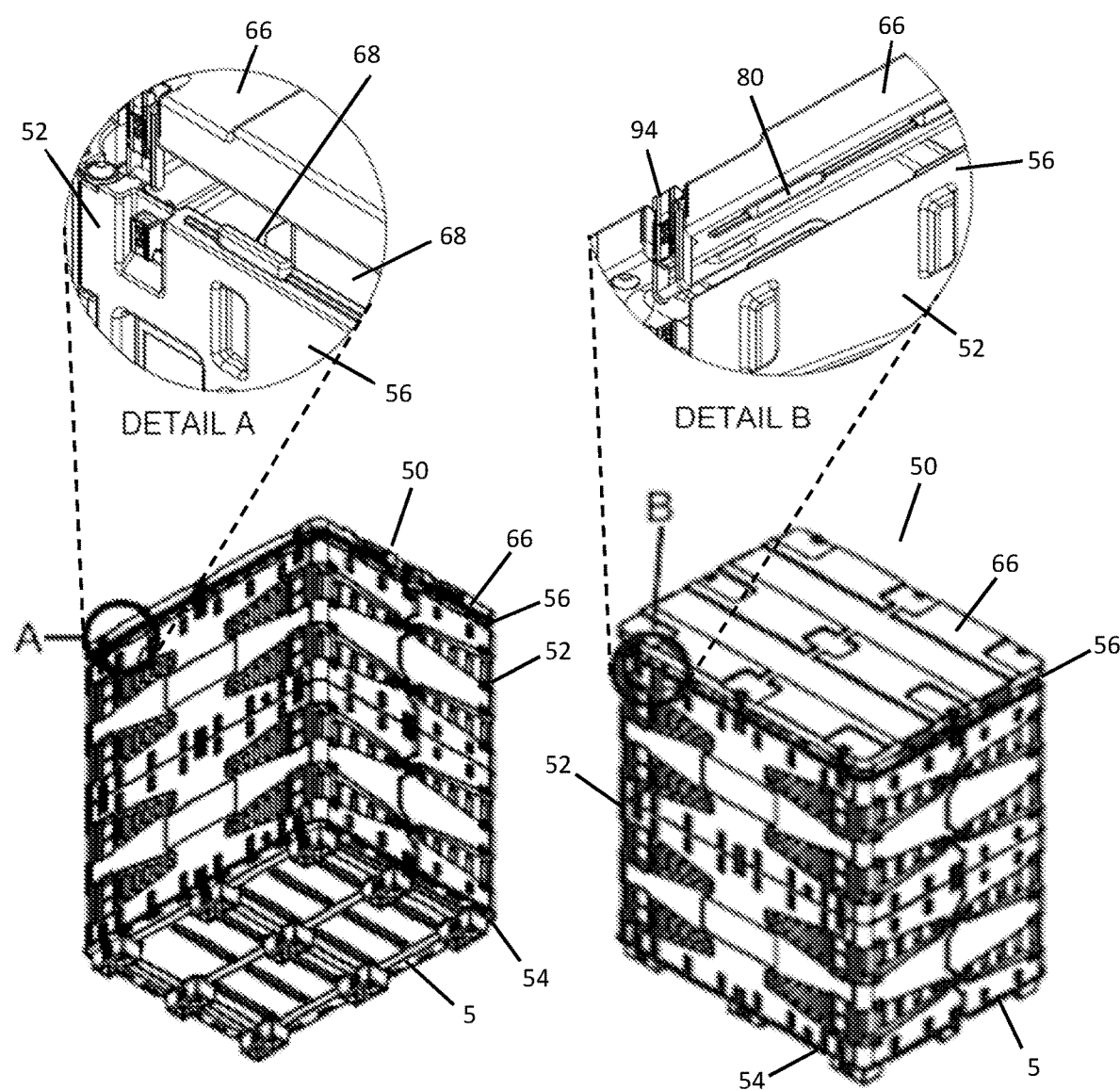
FIG. 16a is a lower perspective view of the side wall to lid connection of the two-tiered crate of FIG. 2.
FIG. 16b is an upper perspective view of the side wall to lid connection of the two-tiered crate of FIG. 2.

As shown in FIG. 1, one aspect of the present disclosure is a crate 50 including a pallet base 5 and an enclosure frame 52. The enclosure frame 52 can have a first or bottom end 54 and second top end 56 opposite the first end 54, the first end 54 of the enclosure frame 52 removably connectable to the pallet base 5 to define a storage volume 68 (beneath the lid 66 in FIG. 16a) between the pallet base 5 and the enclosure frame 52, the enclosure frame 52 having four side walls 58a, 58b, 58c, and 58d forming four corners 60a, 60b, 60c, 60d, on the enclosure frame 52 when the first end 54 of the enclosure frame 52 is connected to the pallet base 5, each of the side walls 58a, 58b, 58c, and 58d being pivotally connected to adjacent side walls at corresponding corners 60a, 60b, 60c, and 60d of the enclosure frame 52. The crate 50 can include a lid 66 removably connectable to the second end 56 of the enclosure frame 52. In some embodiments, when the enclosure frame 52 is connected to the pallet base 5, the enclosure frame 52 can include first and second side walls 58a and 58b positioned opposite one another on the pallet base 5 and third and fourth side walls 58c and 58d positioned opposite one another on the pallet base 5. In some embodiments, each of the third and fourth side walls includes: a first side wall portion 15b pivotally connected to the first side wall 58a; and a second side wall portion 15c pivotally connected to the second side wall 58b, wherein the first and second side wall portions 15b and 15c are removably connectable to one another when the enclosure frame 52 is connected to the pallet base 5.

Figure 12:
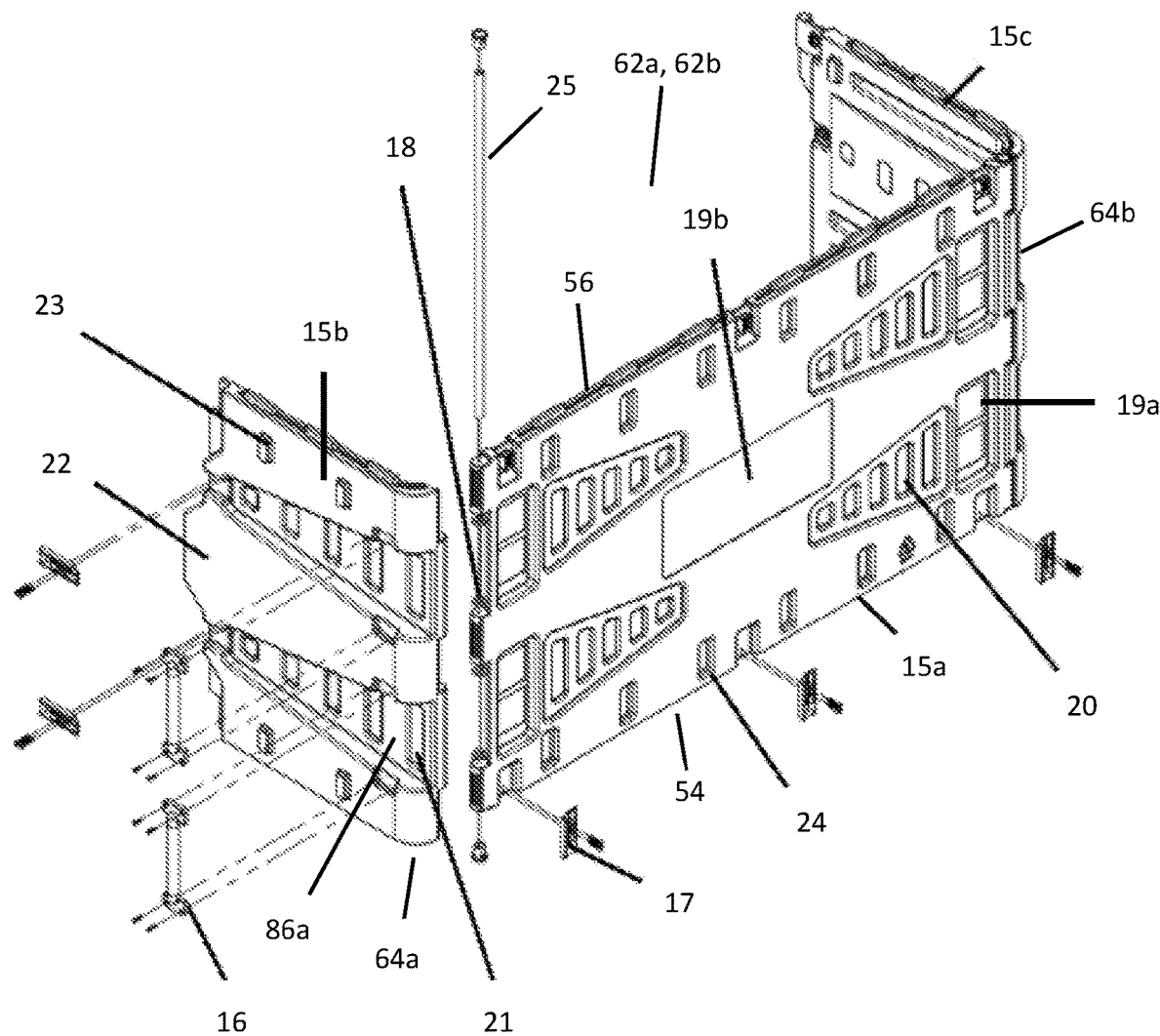
FIG. 12 is an exploded view of a side wall assembly of the crate of FIG. 1.
Figure 20A:
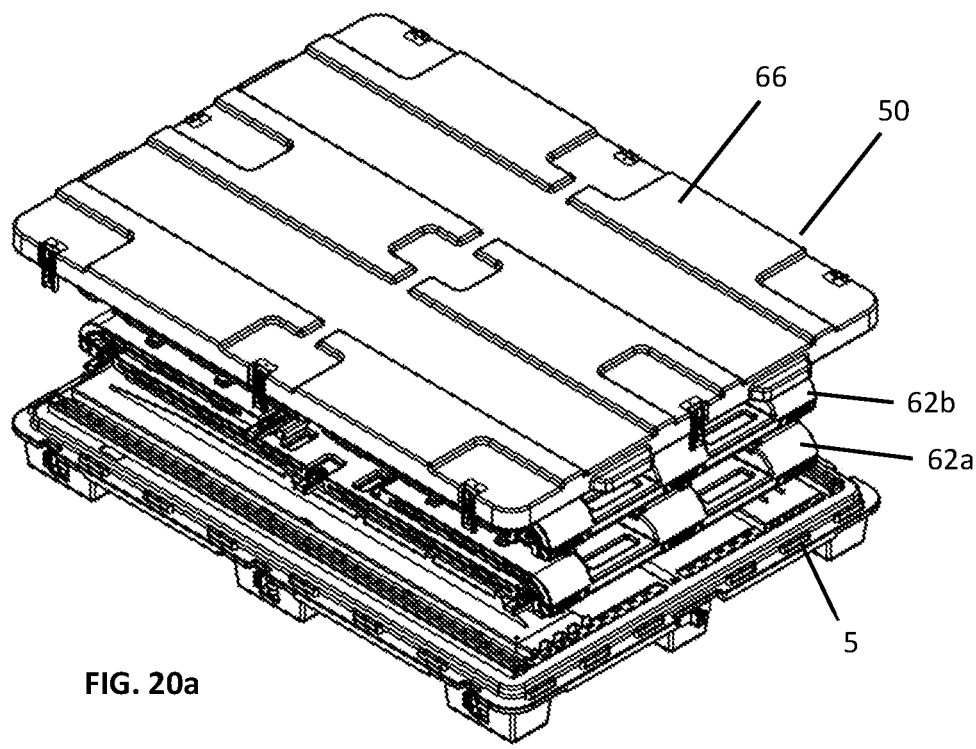
FIG. 20a is a perspective view of an embodiment of a single-tier crate of the present disclosure disassembled and collapsed for return shipping.
Figure 20B:
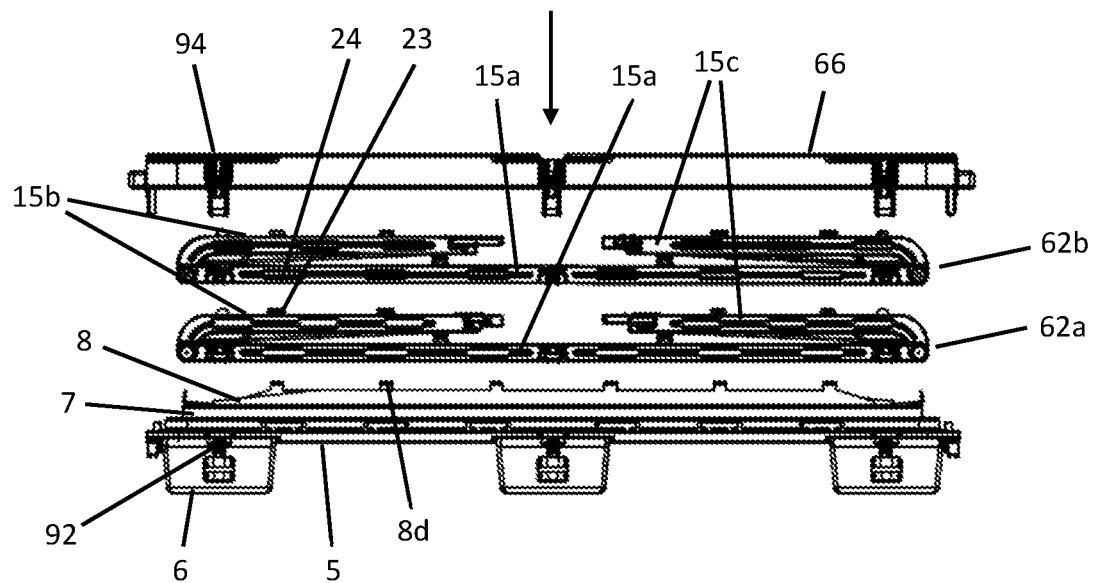
FIG. 20b is a front elevation view of an embodiment of a single-tier crate of the present disclosure disassembled and collapsed for return shipping.

Another aspect of the present disclosure, shown in FIGS. 1, 12, and 20b, is a crate 50 including a pallet base 5 and a pair of side wall assemblies 62a and 62b. Each side wall assembly 62a and 62b can include a side wall 15a having a first side wall end 64a and a second side wall end 64b. A first side wall portion 15b can be pivotally connected to the first side wall end 64a, and a second side wall portion 15c can be pivotally connected to the second side wall end 64b; wherein the first side wall portions 15b of each side wall assembly 62a and 62b can be removably connected to each other and the second side wall portions 15c of each side wall assembly 62a and 62b can be removably connected to each other to form an enclosure frame 52 including the first side wall 58a, the second side wall 58b, a third side wall 58c including the first side wall portions 15b, and a fourth side wall 58d including the second side wall portions 15b, the enclosure frame 52 having a bottom end 54 and a top end 56, the bottom end 54 removably connectable to the pallet base 5. The crate 50 can include a lid 66 removably connectable to the top end 56 of the enclosure frame 52.

FIG. 12 shows an exploded view of the side wall assemblies 62a and 62b. The side walls 15a and side wall portions 15b and 15c of the side wall assemblies 62a and 62b can include a blow-molded long main side wall 15a that is pivotally connected to a first side wall portion 15b and second side all portion 15c wall on corresponding ends 64a and 64b of the main side wall 15a, the side wall portions 15b and 15c being shorter than the main side wall 15a so the side wall portions 15b and 15c can be foldable onto the main side wall 15a during storage of the crate 50. In some embodiments, the first and second side wall portions 15b and 15c can be of a similar size but are different patterns to allow for an overlapping and interlocking relationship, as shown in FIG. 1, between opposing first and second side wall portions 15b and 15c when multiple side wall assemblies 62a and 62b are connected together by connecting first and second side wall portions 15b and 15c together.

In some embodiments, the side wall assemblies 62a can include one or more a handles 16 that can be made of either plastics, metal or a combination of both. In some embodiments, each short side wall portion 15b and 15c can include two container handles 16 that can be used to manipulate the crate 50. For easier repair, the handles 16 can be held in place by screws. The side wall portions 15b and 15c can include handle recesses 86 for each handle 16, and the handle 16s can span across corresponding handle recesses 86. The handle recesses 86 can provide clearance for a user to grab the handles 16 while allowing the handles 16 to be oriented generally flush with the side wall portions 15b and 15c. Having a flush orientation of the handles 16 with the side wall portions 15b and 15c can help reduce damage to the handles 16 during transport of the crate 50. While the handles are shown on side wall portions 15b and 15c, in other embodiments, handles 16 and handle recesses 16 can be disposed on the main side wall 15a of the side wall assemblies 62a and 62b.

The side wall 15a in some embodiments can include indentations 19a where shipping labels or other information can be located. The side wall 15a can also include additional areas 19b where a company logo or other information can be located. In some embodiments, the side walls 15a can include multiple areas 20 wherein the two sides of the blow molded plastic for the side wall 15a and side wall portions 15b and 15c come together and contact. These contact areas 20 can help provide strength and rigidity to the long main side wall 15a. Similar contact areas 21 can be included in the short side wall portions 15a and 15c that provide strength and rigidity for those pieces. In some embodiments, the side wall assemblies 62a and 62b can include an interlocking protrusion 22 extending from on the first and/or second side wall portions 15b and 15c that creates an overlap and interlocking arranging with an interlocking recess 88 on an opposite side wall portion 15b and/or 15c when the side wall assemblies 62a and 62b are put together to form a tier 70, as shown in FIG. 1.

Referring again to FIGS. 12 and 20b, the short side wall portions 15b and 15c can include one or more stacking protrusion 23. When the short side wall portions 15b and 15c are rotated in on the main side wall 15a to allow for stacking of multiple side wall assemblies 62a and 62b, these stacking protrusions 23 can into corresponding stacking cavities 24 on the main side wall 15a of the side wall assembly 62a and 62b stacked on top of it. This feature allows the side wall assemblies 62a and 62b to nest on each other and to be stacked easily during storage and transportation of empty and disassembled crates 50.

Figure 13:
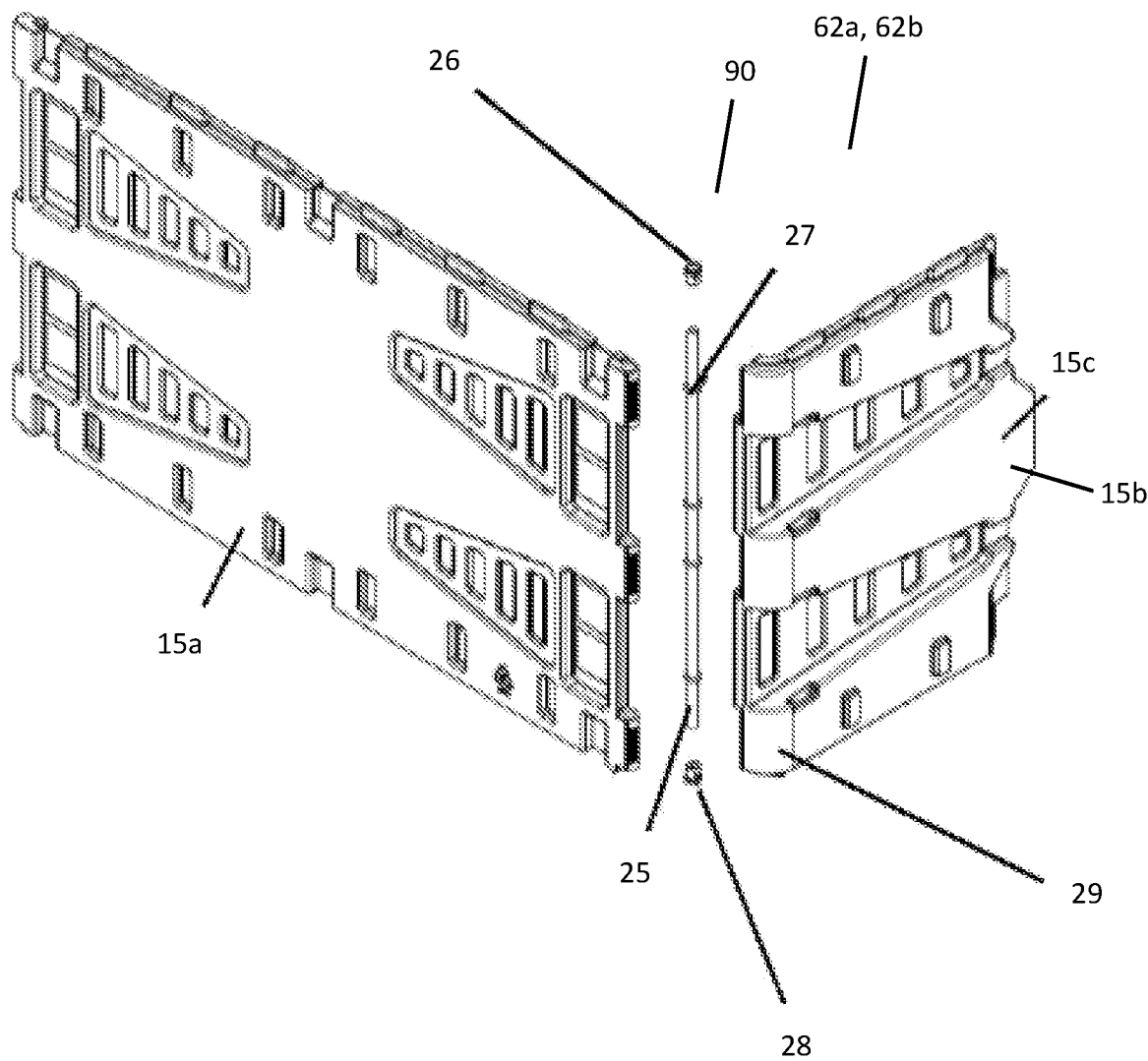
FIG. 13 is an exploded view of a hinge assembly of the side wall assembly of FIG. 12.

FIG. 13 shows the hinge assembly 90. The hinge assembly incorporates a hinge pin 25 that can be metal or plastic. The hinge pin 25 can be received through pin apertures defined on ends of the side wall 15as and the side wall portion 15c. An upper cap 26 and a lower cap 28 can cover opposing ends of the hinge pin 25 once received through corresponding side wall 15a and side wall portion 15c. The hinge assembly 90 can include multiple bushings that allow the hinge pin 25 and side wall 15a and side wall portion 15c to rotate on each other and help reduce wear on the components of the side wall assemblies 62a and 62b. In some embodiments, the hinge middle bushing is made of rubber or a similar pliable material with the upper and lower bushings being made from plastic.

The crate 50 having side walls 58a, 58b, 58c, and 58d that are pivotally connected to one another, or side wall assemblies 62a and 62b with side walls 15a and side wall portions 15b and 15c pivotally connected to one another can allow the side walls 58a, 58b, 58c, and 58d and/or side wall assemblies 62a and 62 to be removed from the pallet base 5 and folded onto themselves. The side walls 58a, 58b, 58c, and 58d or side wall assemblies 62a and 62b can then be folded into a flat orientation such that the enclosure frame 52 and the side walls contained therein can be stacked between the pallet base 5 and the lid 66 for easy reshipping of the crate 50 back to an original or otherwise desired location.

Figure 2:
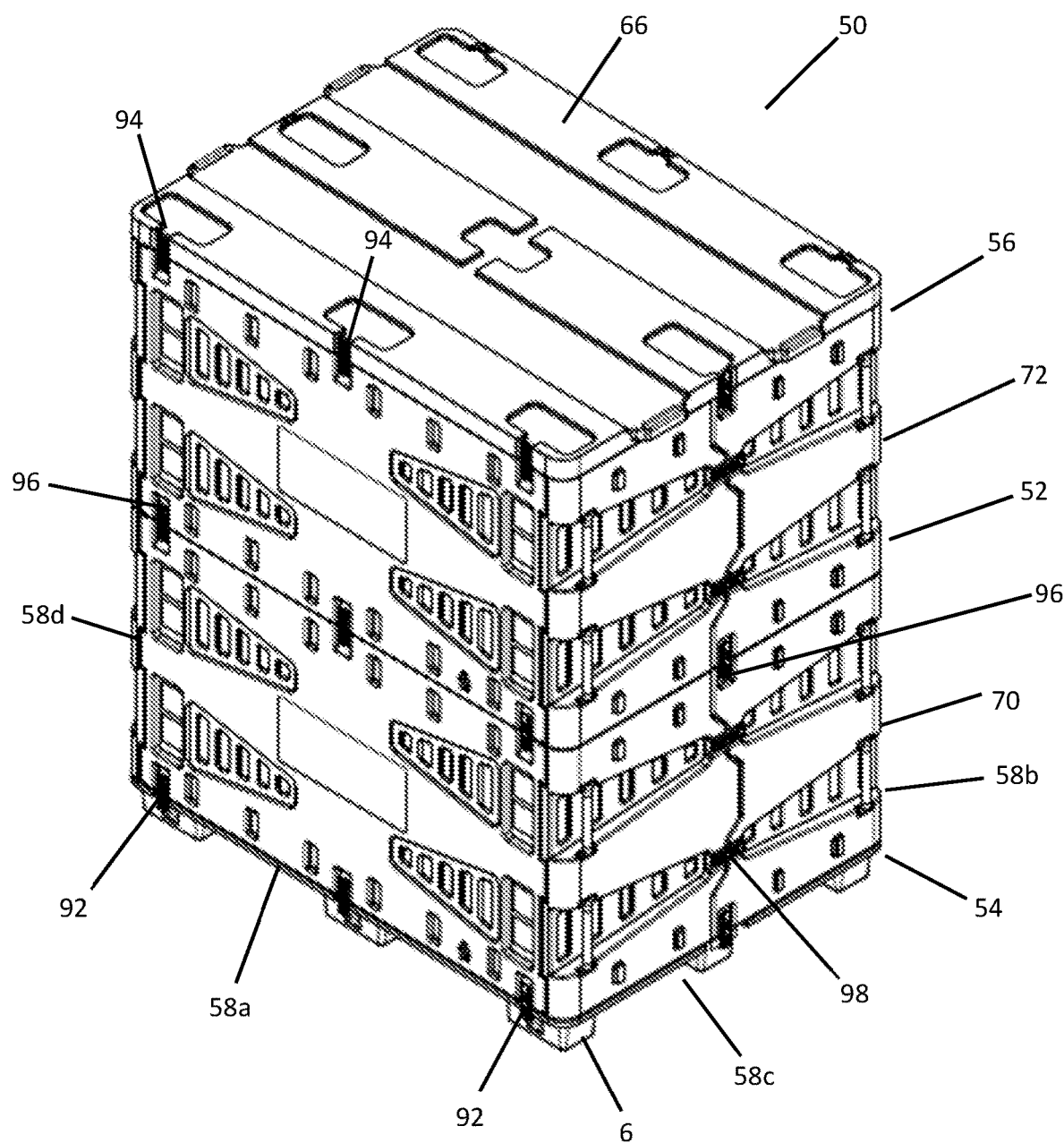
FIG. 2 is a perspective view of another exemplary two-tier crate of the present disclosure.
Figure 3:
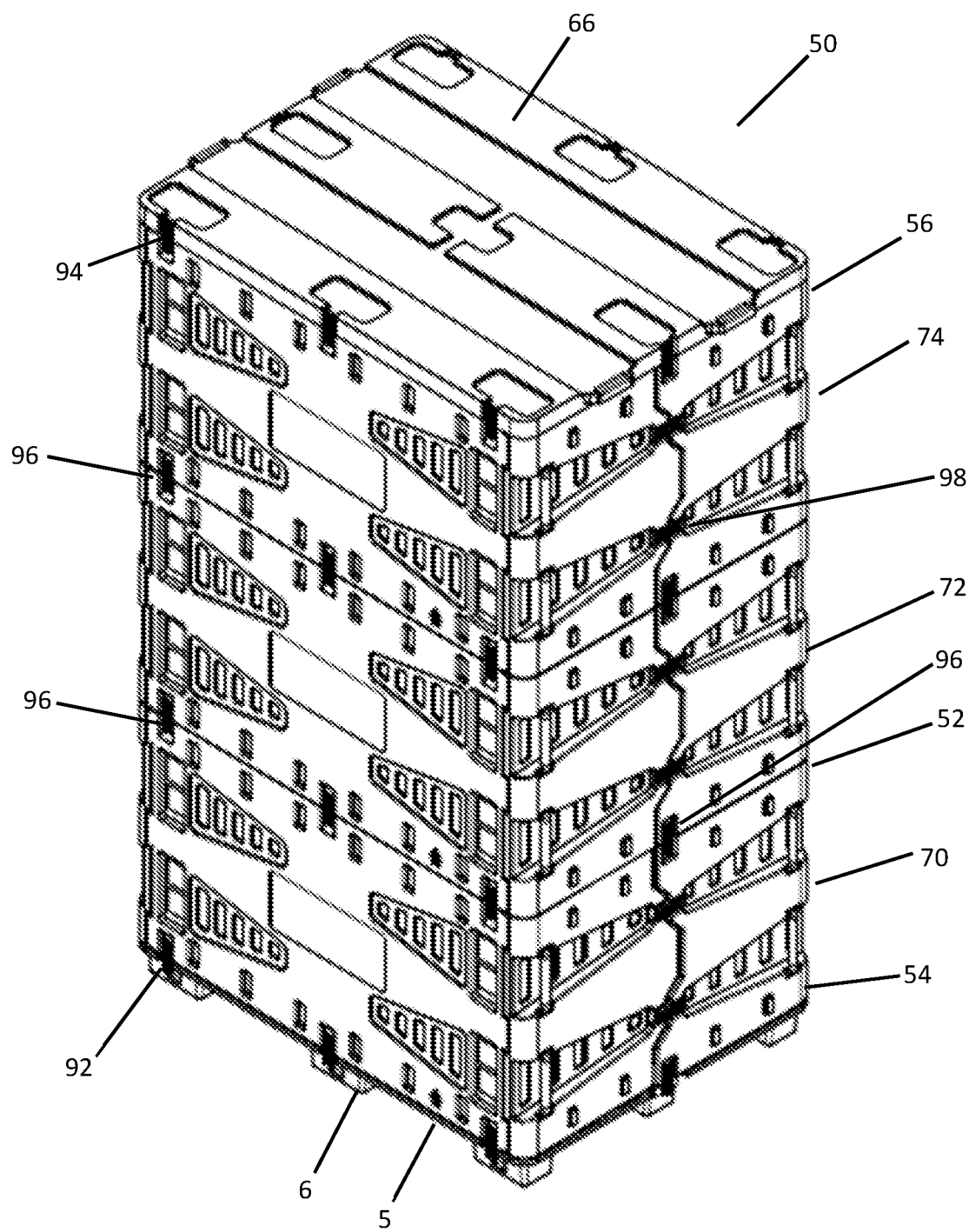
FIG. 3 is a perspective view of an exemplary three-tier crate of the present disclosure.

In some embodiments, the crate 50 can include a set of risers 6, a pallet base 5, one, two, three, or more tiers of side walls and a lid 66. For example, FIG. 1 depicts a single tier crate 50 with the pallet base 5, a single or first tier 70 of side walls and a lid 66. By way of another example, FIG. 2 depicts a two-tier crate 50 with a pallet base 5, a first tier of sidewalls 70, a second tier of sidewalls 72, and a lid 66. In such embodiments, the second tier of sidewalls 72 can be stacked on top of the first tier of sidewalls 70, such that the first and second tiers of sidewalls 70 and 72 together form the enclosure frame 52. The first tier of side walls 70 can define the first or lower end 54 of the enclosure frame 52 that is removably connectable to the pallet base 5, and the second tier of sidewalls 72 can define the second or upper end 56 of the enclosure frame 52, with the lid 66 being removably connected to the second or upper end 56 of the enclosure frame 52. FIG. 3 depicts a three-tier crate 50 with a pallet base 5, a first tier of sidewalls 70, a second tier of sidewalls 72, a third tier of sidewalls 74 and a lid 66. In such embodiments, the second tier of sidewalls 72 can be removably connected between the first and third tiers of side walls 70 and 74, such that the first tier of side walls 70 can define the first or lower end 54 of the enclosure frame 52, and the third tier of sidewalls 74 can define the second or upper end 56 of the enclosure frame 52. Each tier of sidewalls 70, 72, 74 in some embodiments can include four sidewalls to form a substantially rectangular crate 50. In other embodiments, each tier of sidewalls 70, 72, 74 can include 3, 4, 5, or 6, etc. pivotally connected side walls to accommodate cargo of various shapes.

Figure 4:
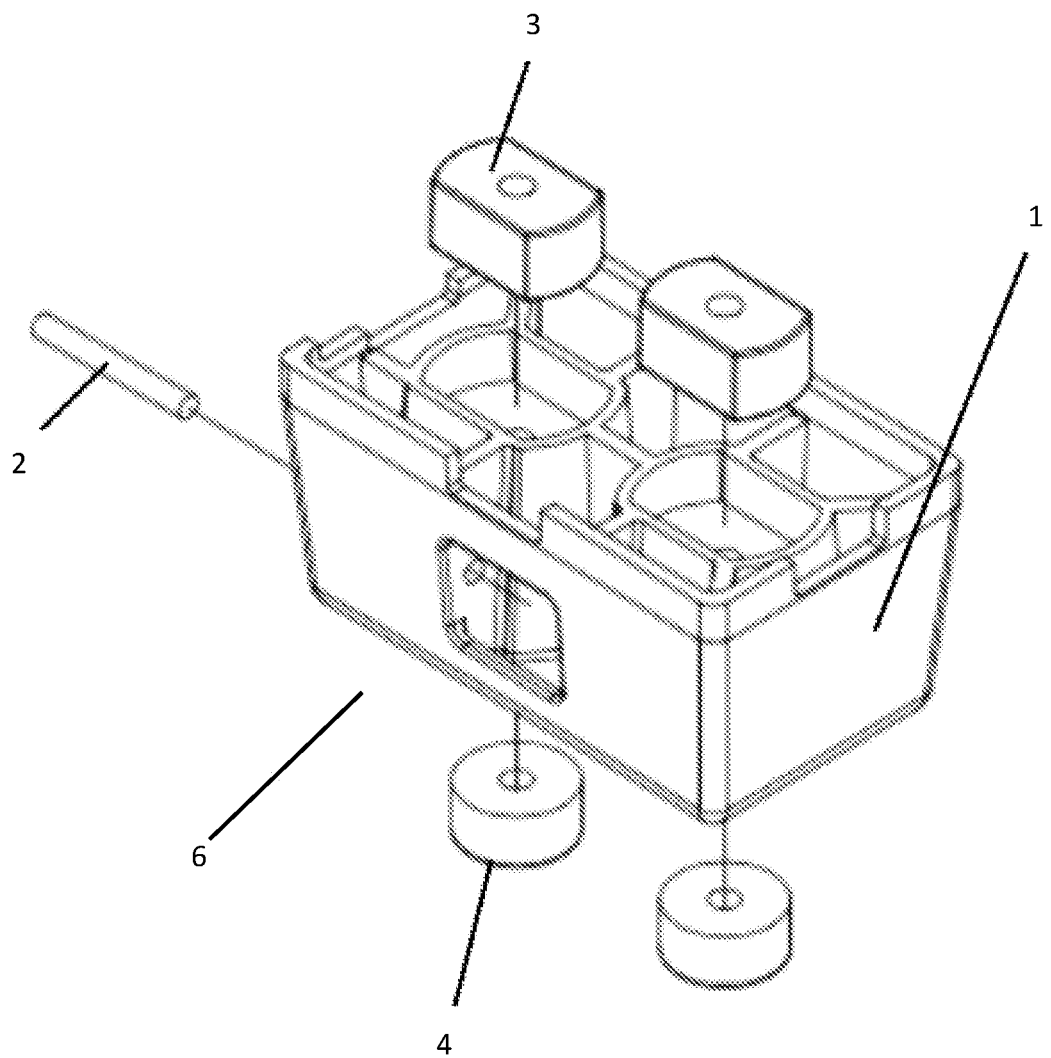
FIG. 4 is an exploded view of an embodiment of a riser assembly of a crate of the present disclosure with included EPDM dampeners (shock isolators).

FIG. 4 depicts the riser assembly 6. The riser assembly 6 can include a riser body 1 that can be composed of any plastics or glass-filled plastic material. In some embodiments, nine riser assemblies 6 can be connected to the pallet base 5 and provide a height sufficient for inserting a forklift or pallet jack beneath the pallet base 5. The riser body 1 may include a cut out on the outside wall on one or both sides with a rod 2 inserted in the riser body 1 and accessible through the opening that allows for straps or other materials to loop around or hook to the rod 2 in fastening cargo or crate components.

Figure 5:
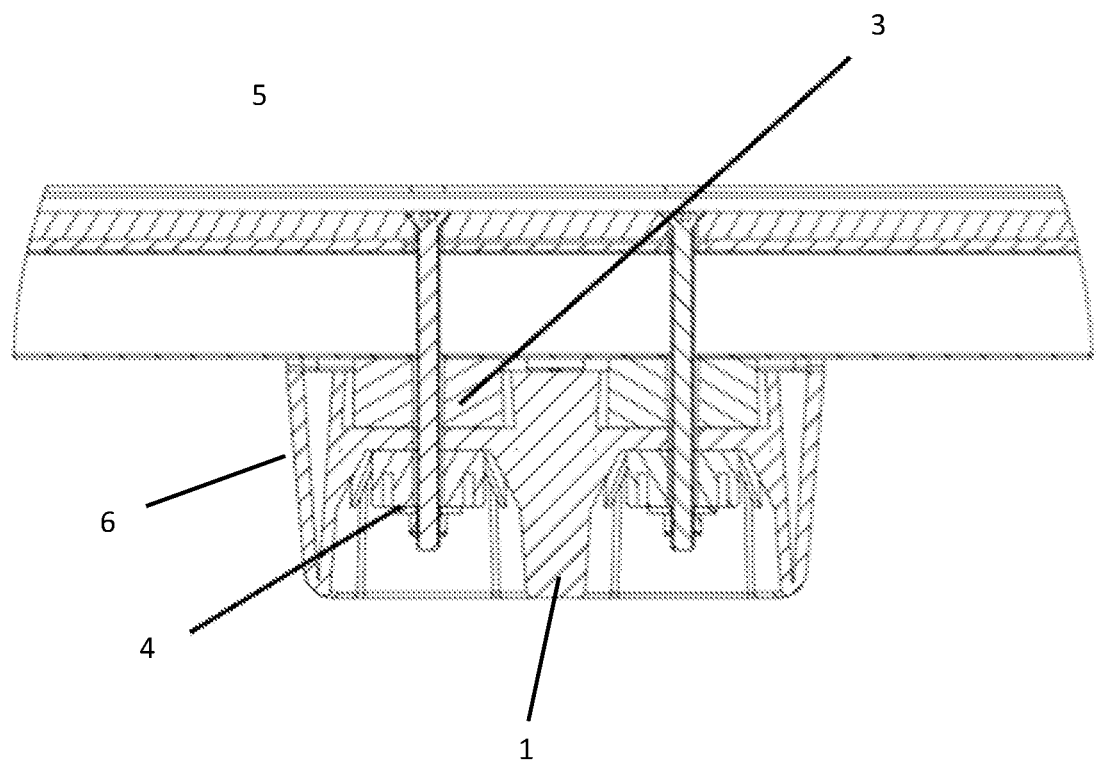
FIG. 5 is a cross-sectional view of the riser assembly of FIG. 4 connected to a pallet base.

The riser assembly 6 can also include an upper shock dampener 3. The upper shock dampener 3 may include a larger size and durometer or hardness and serves to reduce the transmission of high external shocks on the internal cargo contained within the crate 50. The riser assembly 6 can also include a lower shock dampener 4. The lower shock dampener 4 is smaller in size and may include a lower durometer or hardness to reduce vibration. The lower shock dampener 4 also may include a concentric ring of material removed to reduce vibration transmission through the riser assembly 6 into the pallet base 5. The interior solid portion is sufficient to provide tension against the nut and bolt assembly during shocks or impacts where compression occurs. The riser assembly 6 can be fastened to the pallet body 5 utilizing at least one bolt and nut fasteners through the centerline of the riser as shown in the cross-sectional view of FIG. 5. In some embodiments, two bolt and nut fasteners can be used to secure each riser assembly 6 to the pallet base 5. The pallet base 5 can rest atop the upper shock dampener 3 such that the upper shock dampener 3 is compressed when weight is applied to the top of the pallet base 5.

Figure 6:
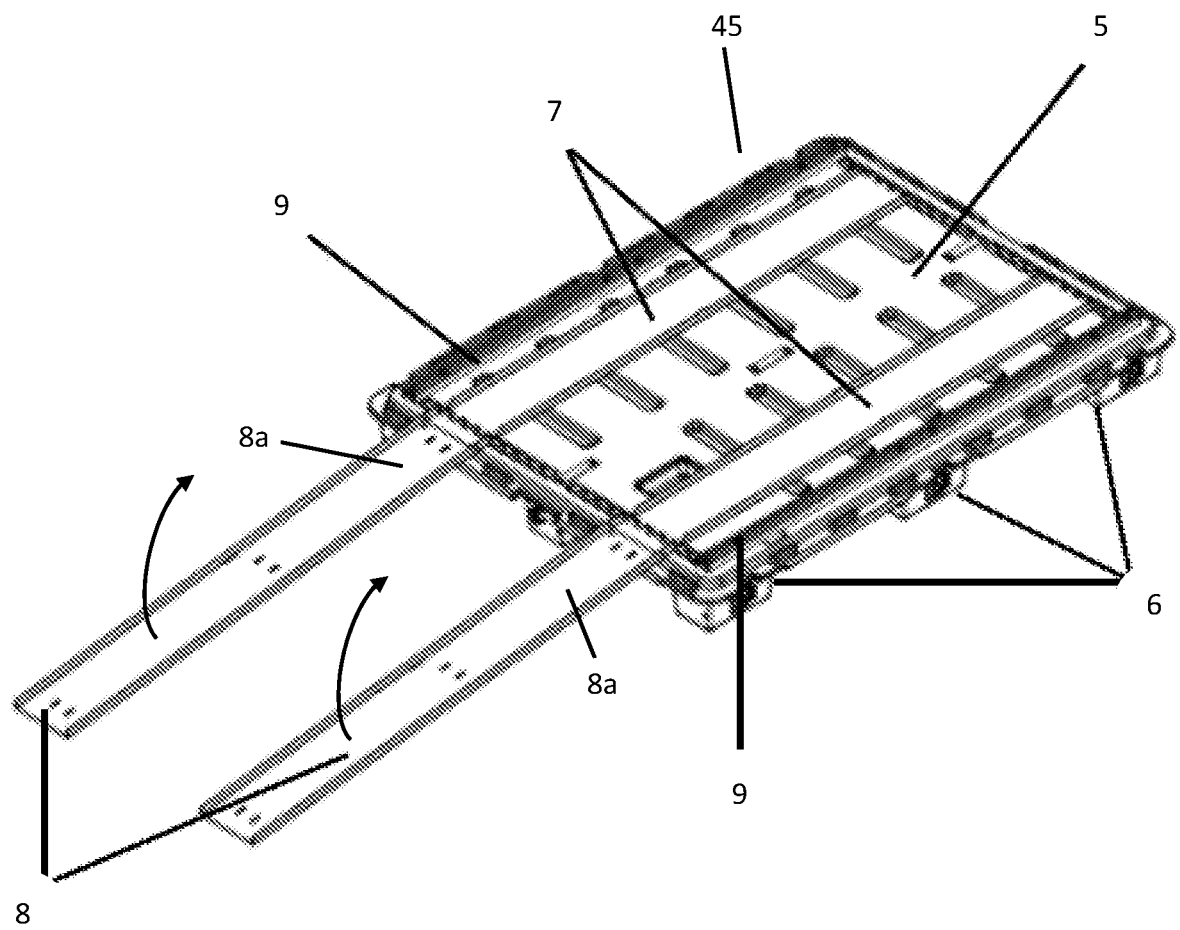
FIG. 6 is a perspective view of a pallet base of the crate in FIG. 1 including a ramp assembly.

FIG. 6 depicts a pallet assembly 45. The pallet assembly 45 can include the pallet base 5, the riser assemblies 6, a pair of channels 7, a pair of ramps 8, and fixation rails 9. The pallet base 5 rests on the upper shock dampener which nests in the riser body. The pallet base 5 can be made from a variety of plastics or metals, with strength, rigidity and safety against breakage being the primary considerations.

Figure 7:
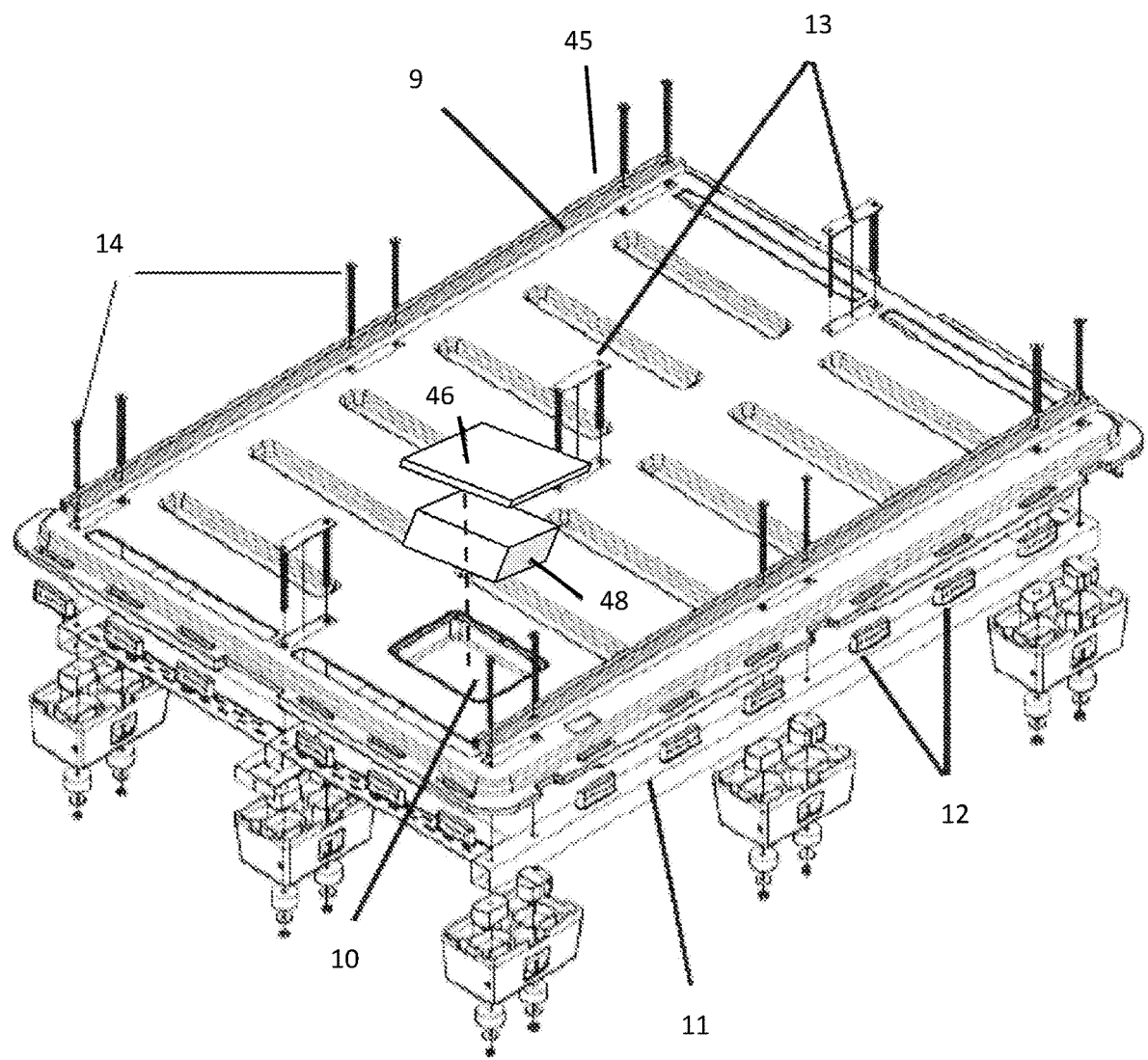
FIG. 7 is an exploded view of the pallet assembly of FIG. 1.
Figure 8:
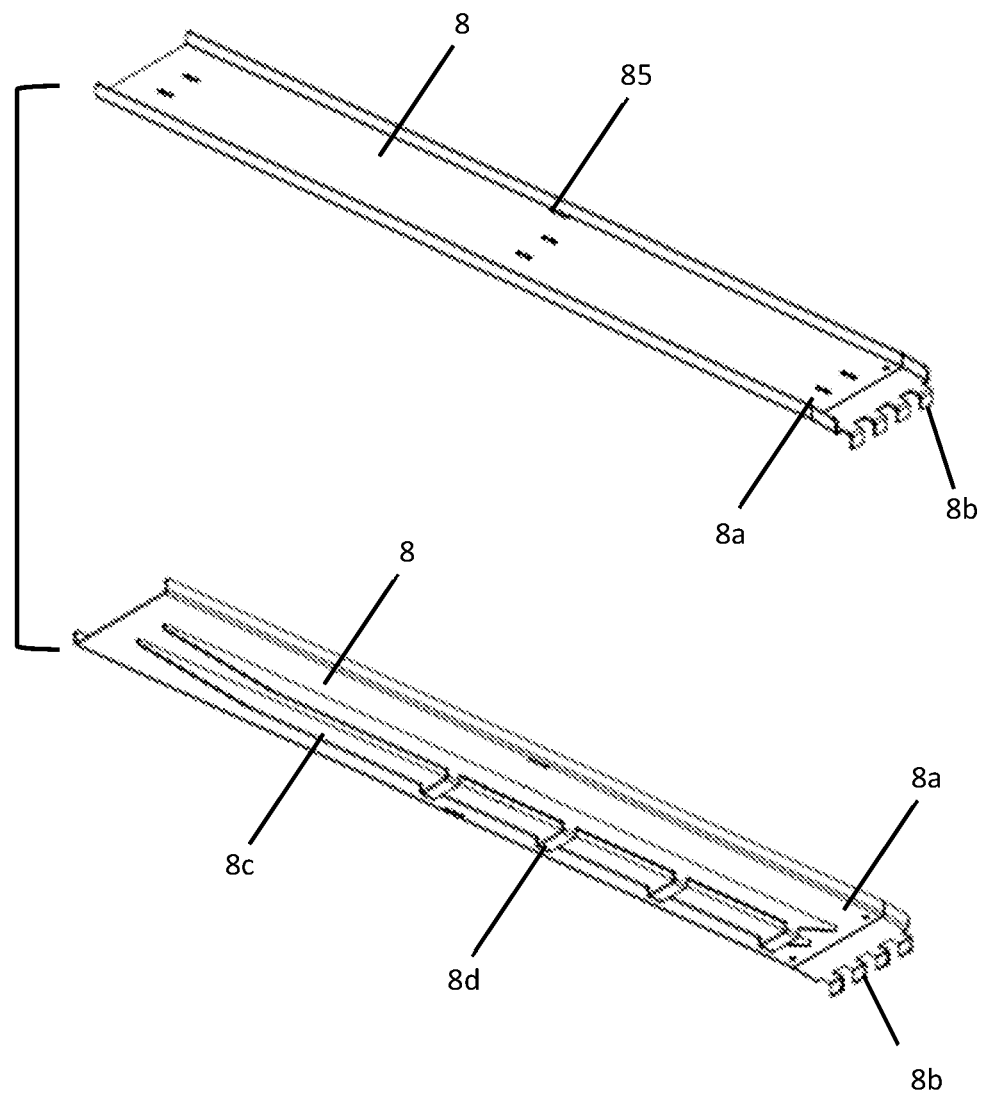
FIG. 8 is an upper and lower perspective view of exemplary ramps for the crate of FIG. 6.
Figure 9:
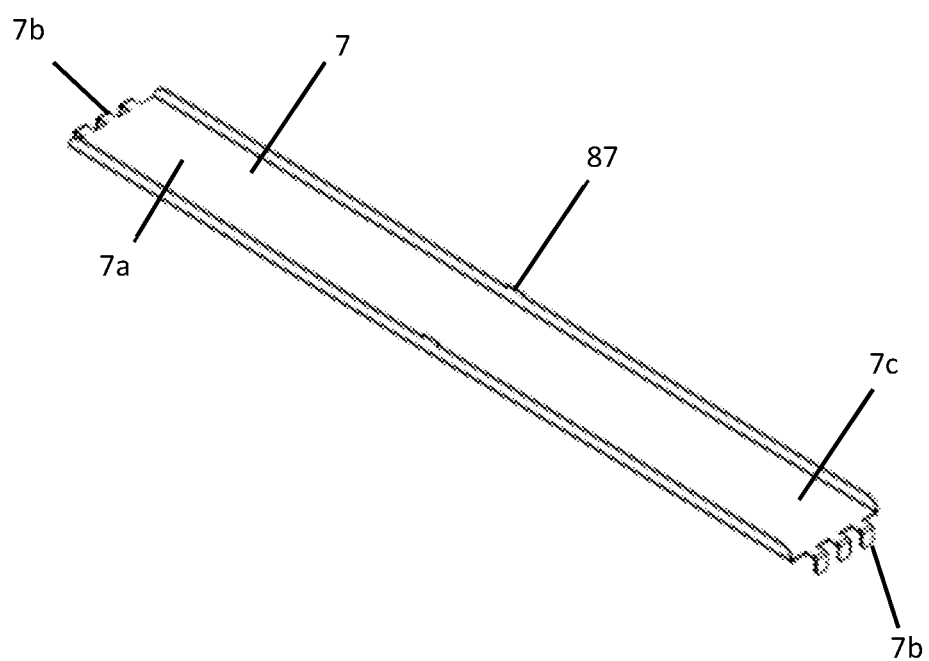
FIG. 9 is a perspective view of a channel associated with the ramp of FIG. 8.

FIG. 7 depicts an exploded view of the pallet assembly 45. The pallet assembly 45 can include a pocket 10 in the surface of the pallet base 5 that allows for placement of a tracking device 48 for condition and location monitoring. The pocket 10 can have a lid 46 that can be screwed in to protect the tracking device 48. The lid 10 may have at least one hole in it to allow light and air to be transmitted to allow the tracking device 48 to measure humidity, temperature, and the presence of light in the crate 50.

In some embodiments, the bottom of the pallet base 5 may include multiple cavities or channels (not shown) that include perimetric channels that run around the perimeter of the pallet base 5 and other channels or cavities that run across the pallet base 5 in perpendicular directions from the perimetric channels or cavities. In some embodiments, the pallet base 5 can include a supporting metal frame 11 that can nest inside these lower cavities or channels in the pallet base 5. The cavities or channels in the pallet base 5 can generally conform to a shape of the metal frame 11. The frame 11 can include metal tubing that can be welded together or cast to provide rigidity to a plastic pallet base 5, in order to help reinforce the pallet base 5 to support heavy cargo such as data servers and electrical panels. The metal tubing can run along the edges of a longer side of the pallet base 5 and can have multiple sections running perpendicular and connecting the two long sides together.

In some embodiments, the pallet base 5 can include sets of two threaded rods 13 that are welded or connected in some other fashion to a flat piece of metal. These rods 13 may be used in the center section of the pallet base 5 to bolt the riser assemblies 6 and isolators 3 and 4 to the pallet base 5. Bolts 14 may also be used on the edges of the pallet base 5 to connect some of the riser assemblies 6, pallet base 5 and fixation rails 9 together.

Referring now to FIGS. 14a and 14b, the perimeter of the pallet base 5 can be lined with a first set of guide protrusions 12, or "teeth". These guide protrusions 12 can be generally rectangular in some embodiments, but could also be in the form of other geometric shapes (circles, oval, square, trapezoidal, etc.). The crate 50 can also include a first set of guide recesses 76 on the first end of the enclosure frame 52. Each of the guide projections 12 on the pallet base can be receivable in a corresponding guide recess 76 defined in the first end of the enclosure frame 52, or the side walls positioned immediately above the pallet base 5, to align the enclosure frame 52 and the side walls of the crate 50 on the pallet base 5.

Referring now to FIGS. 16a and 16b, a top or second end 56 of the enclosure frame 52 can include a second set a second set of guide protrusions 78, and the bottom of the lid 66 can include a second set of guide recesses 80. Each of the second set of protrusions 78 on the enclosure frame 52 can be received in a corresponding guide recess of the second set of guide recesses 80 in the lid 66 to nest and align the lid 66 on the enclosure frame 52.

Figure 15A:
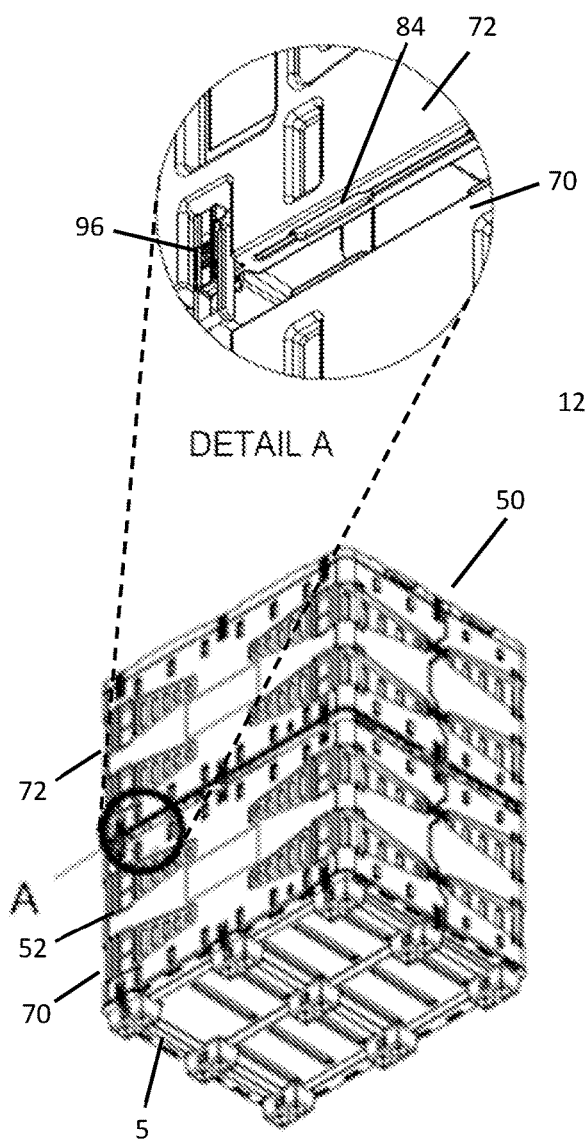
FIG. 15a is a lower perspective view of the side wall to side wall connection of the two-tiered crate of FIG. 2.
Figure 15B:
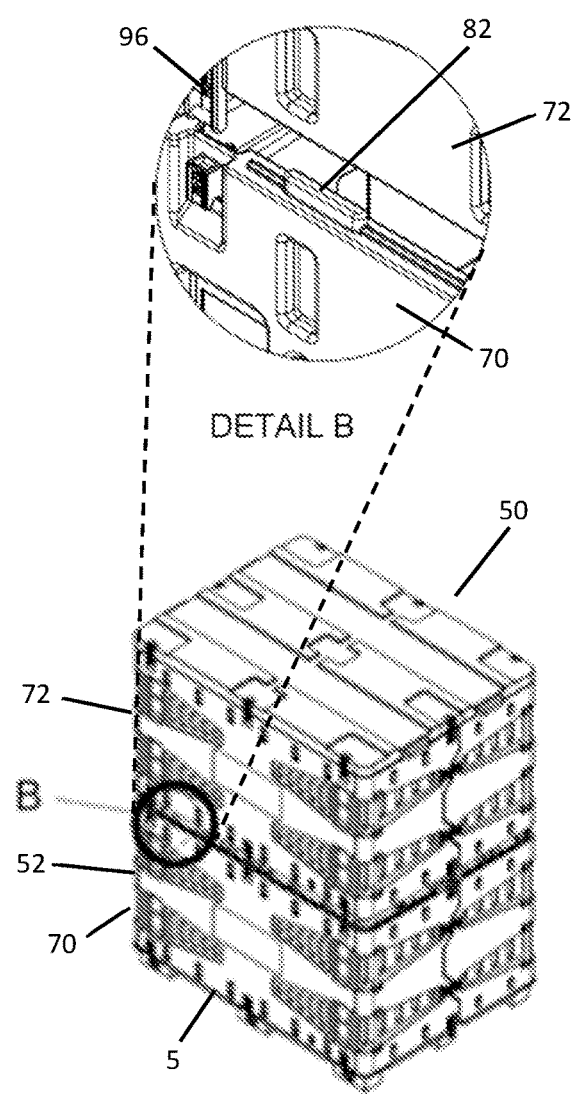
FIG. 15b is an upper perspective view of the side wall to side wall connection of the two-tiered crate of FIG. 2.

Referring now to FIGS. 15a and 15b, in embodiments with multiple tiers of side walls, each of the tiers of side walls 70 and 72 can be aligned and removably connected with one another using additional sets of guide protrusions and corresponding guide recesses. For instance, a top of the first tier of side walls 70 can include a third set of guide protrusions 82, and the bottom of the second tier of sidewalls 72 can include a third set of guide recesses 84. Each of the third set of protrusions 82 on the first tier of sidewalls 70 can be received in a corresponding guide recess of the third set of guide recesses 84 to nest and align the first tier of sidewalls 70 with the second tier of sidewalls 72 on the enclosure frame 52. Additional tiers of sidewalls can be removably connected in succession using similar sets of guide projections and guide recesses.

Referring to FIGS. 1-3, 12, and 14-16, in some embodiments, the crate 50 can include a first plurality of latch assemblies 92 that can removably connect the pallet base 5 to the first end 54 of the enclosure frame 52 and side walls 58a, 58b, 58c, and 58d. In some embodiments, the crate 50 can include a second plurality of latch assemblies 94 operable to removably connect the second end 56 of the enclosure frame 52 to the lid 66. Additional pluralities of tier latch assemblies 96 can be provided to removably connect subsequent tiers 70, 72, and 74 together. In still other embodiments, the short side wall portions 15b and/or 15c can include one or more side wall portion latch assemblies 98 that are operable to connect the side wall portions 15b and 15c to opposing side wall portions 15b and 15c on side wall assemblies 62a and 62b being connected together via their side wall portions 15b and 15c. The one or more side wall portion latch assemblies 98 can include at least a third side wall latch assemblies connecting first and second side wall portions 15b and 15c of the third side wall 58c and a fourth side wall latch assembly connecting first and second side wall portions 15b and 15c of the fourth side wall 58d.

As such, the horizontal latch assemblies 98 can be utilized to connect different side wall assemblies 62a and 62b together to form the enclosure frame 52. The first plurality of latch assemblies 92 and the first sets of guide protrusions 12 and guide recesses 76 can be used to align and removably connect the pallet base 5 to the lower end 54 of the enclosure frame 52. The second plurality of latch assemblies 94 and the second sets of guide protrusions 78 and guide recesses 82 can be used to align and removably connect the lid 66 to the top end 56 of the enclosure frame 52, and the tier latch assemblies 96 and additional sets of guide protrusions 82 and guide recesses 84 between successive tiers of side walls 70, 72, and 74 can be used to align and removably connect success tiers of side walls together. In some embodiments, each side wall 15a on each side wall assembly 62a and 62b can have at least 3 vertical latch assemblies 92 connecting the side wall 15a to the pallet base 5, at least 3 vertical latch assemblies 94 or 96 connecting the side wall 15a to the lid 66 or to an above tier of sidewalls 66 or 72, 73 respectively, and at least 2 horizontal latches 98 connecting pairs of side wall portions 15b and 15c together. At least one additional vertical latch can be used to connect one or more of the first and second side wall portions 15b and/or 15c to the pallet base 5 and/or the lid 66 for additional stability.

Figure 18:
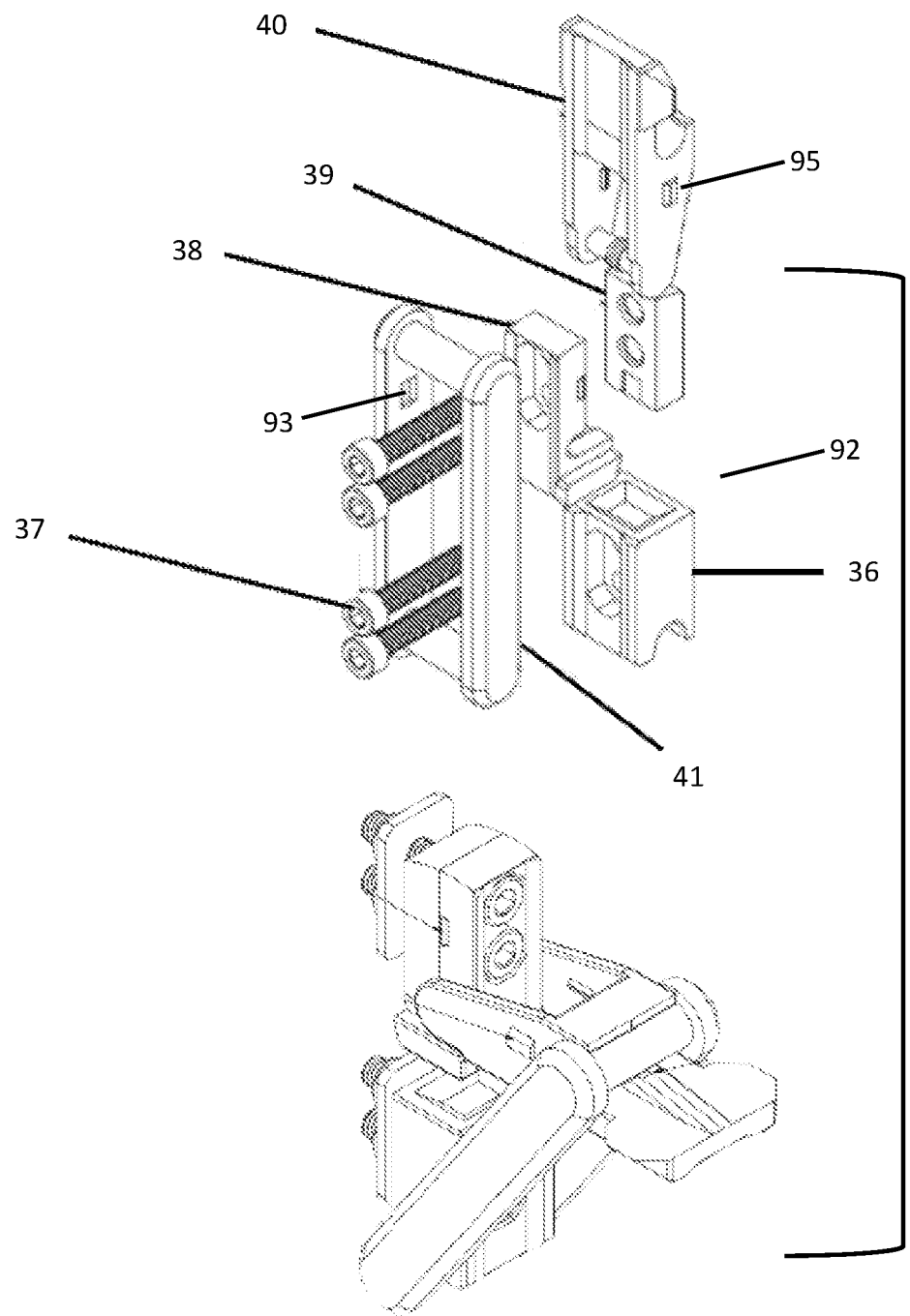
FIG. 18 is an exploded view of an exemplary latch assembly of a crate of the present disclosure.

FIG. 18 shows an exemplary latch assembly 92. In some embodiments, all of the latch assemblies 92, 94, 96, and 98 discussed herein can have similar mechanics and resemble the latch assembly 92 shown in FIG. 18. The catch 36 can be made of plastic and is the catch piece over which the elastic (rubber, EPDM, etc.) tensioner 41 is placed before closing the lever 40. The lever 40 can be made of plastic and is held in place by and rotatably disposed on lever housing members 38 and 39 which can both be made of plastic in some embodiments. Bolts 37 can hold all of the latch pieces in place. The catch 36 can be connected to one component to be secured by the latch, and the tensioner 41 and lever 40 can be connected to another component to be secured by the latch. The components (for instance the pallet base 5 and enclosure frame, enclosure frame and lid, etc.) can be positioned near each other such that the tensioner 41 can be engaged with the catch 36 and the lever 40 can be actuated to move the latch assembly 92 to a latched position to removably connect the components together. The tensioner 41 has a small cavity 93 on the inside of the tensioner 41 that can allow a lever protrusion 95 on the outside of the lever 40 to nest when the latch assembly 92 is in the locked position. This helps to keep the latch assembly 92 in the closed position and creates a snapping sound when the latch assembly 92 is latched. Lever housing members 38 and 39 create a hinge for the lever to rotate around when opening and closing the latch.

Referring now to FIGS. 6, 8, 9 and 11, in some embodiments, the crate 50 can include a ramp system that can be used to help roll or load cargo into the assembled crate 50. Ramps 8 can allow items to be rolled onto the pallet base 5. In some embodiments, a pair of ramps 8 can be provided that are removably disposable on the pallet base 5. Each ramp 8 can include at least one ramp tooth 8b at one end 8a of the ramp 8 that allows for the ramp tooth 8b to be received or disposed in ramp apertures 81 defined in the pallet base 5. In some embodiments, the crate 50 can include a long side and a short side, and the ramp apertures 81 can be defined in the short side of the crate 50. The ramp teeth 8b can help keep the ramps 8 from moving apart and help coordinate the location at which they connect to the pallet base 5. Reinforcing ribs 8c may be connected of formed on the bottom of the ramps 8 to provide additional support for extremely heavy objects being loaded. The ribs 8c may run the length of the ramp 8 and taper to off near the beginning edge of the ramp 8 to allow the beginning of the ramp 8 to sit flush on the ground. The reinforcing ribs 8c can have crosspieces 8d that act as supports as well as nesting points for nesting with collapsed side wall assemblies 62a and/or 62b when shipping the crates 50 back in a collapsed state, as shown in FIG. 20b. Referring again to FIGS. 6, 8, 9 and 11, the outside edges of the ramp 8 may be bent up at a 90-degree angle to keep a cart-based device from running off the edge of the ramp during loading. These edges may also help support the stiffness of the ramp 8 surface.

The crate 50 in some embodiments can include a pair of channels 7 removably receivable on the pallet base 7. The pallet channels 7 are designed to help support specific cargo like wheeled devices and devices with legs where the weight is specifically concentrated. The channels 7 can be an extension of the ramps 8 in some embodiments wherein the channels 7 can be aligned with the ramps 8, and vice versa, such that wheeled devices can be rolled from the ramps 8 onto the channel 7. Each channel 7 can have a least one channel tooth that can be bent or extend at a 90-degree angle from the channel bearing surface. The teeth are designed to fit into corresponding channel apertures 83 defined in the pallet base 5. In some embodiments, the channel apertures 83 can run parallel to the short sides of the pallet base 5. The plurality of channel apertures 83 and ramp apertures 81 defined in the pallet base 5 can allow pairs of channels 7 and ramps 8 to be placed on the pallet base 5 at different distances apart to support different cargo items that have different distances between their supporting wheels or legs. The outside edges of the channel 7 are bent up at a 90-degree angle to limit a cart-based device from rolling off the channel 7 onto the plastic surface of the pallet base 5.

The ramps 8 can be rotatable on the pallet base 5 via the ramp teeth 8b within the ramp apertures 81. The ramp teeth 8b can have a generally rounded or curved shape to allow for rotation of the ramp 8 about the ramp teeth 8b within the ramp aperture 81. The ramp may include slits 85. The slits 85 can allow the ramps 8 to be flipped over and seated on ramp catches 87 on corresponding channels 7 when the crate 50 is being shipped back empty. Once cargo is loaded into the crate 50, the ramps 8 can be removed from the ramp apertures 81 and placed inside the crate 50 during shipment of the cargo. In other embodiments, the ramps 8 can be rotated upward to rest against the cargo during shipment. In still other embodiments, the ramps 8 can simply be removed during shipping and an additional set of ramps can be located at the desired shipping location and the receiver of the crate 50 can place their own ramps 8 on the pallet base 5 for unloading of the cargo. In some embodiments, the ramps 8 and the channels 7 can be removable from the pallet base 5 to form a generally flat pallet base 5 surface to support non-wheeled cargo.

Figure 11A:
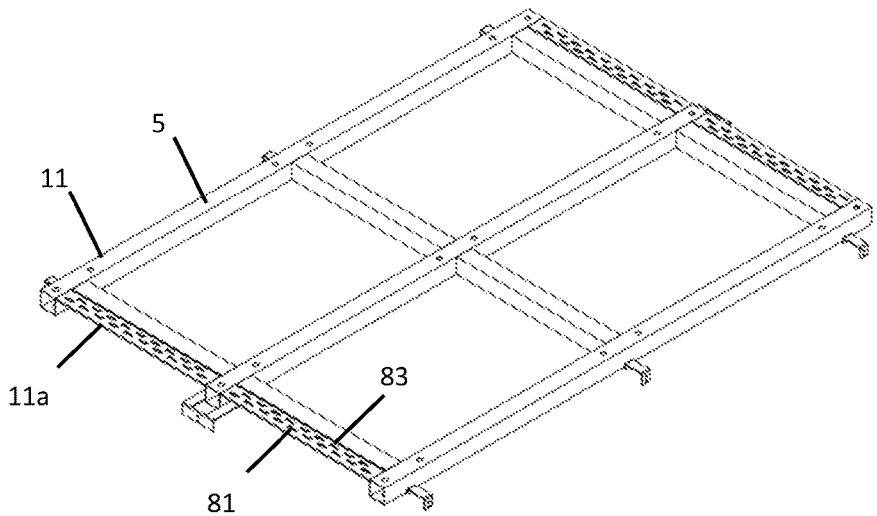
FIG. 11a is a perspective view of a reinforcement frame for the pallet base including apertures for receiving the ramps.
Figure 11B:
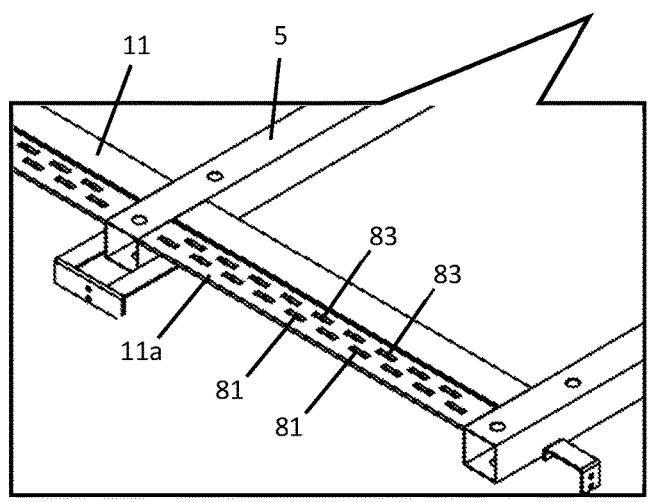
Figure 11C:
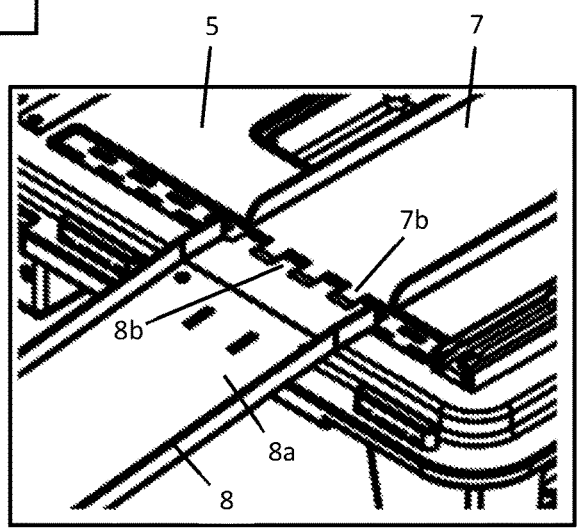
FIG. 11c is a detailed perspective view of a ramp being received in the apertures on the pallet base.

In some embodiments, as shown in FIG. 11a-11c, in some embodiments, the ramp apertures 81 and the channel apertures 83 can be defined in the metal frame 11. FIG. 11 shows a metal plate 11a connected adjacent the metal tubing of the metal frame 11 with the ramp apertures 81 and channel apertures 83 cut out of the metal plate 11a. The apertures 81 and 83 in the plate allow for the teeth from the ramps and channel to be fixed at different locations. In some embodiments, the ramp apertures 81 and the channel apertures 83 can be offset from one another such that multiple ramp teeth 8b received in the ramp apertures 81 and multiple channel teeth 7b received in the channel apertures 83 can form an interlocking arrangement such that the ramp teeth 8b and channel teeth 7b created a generally uniform transition area between the ramp 8 and the channel 7. FIG. 11 shows a metal plate with various openings cut out of it that is connected to the metal support structure. The openings in the plate allow for the protrusions from the ramps and channel to be fixed at different locations.

Figure 10:
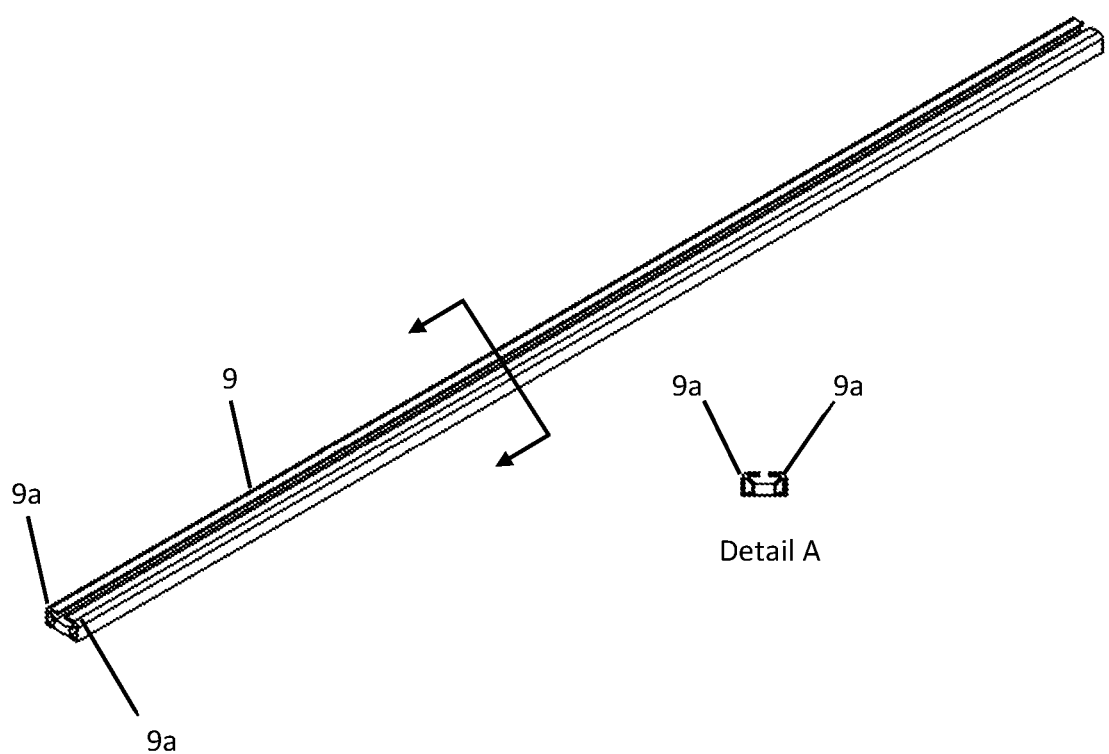
FIG. 10 is a perspective and side view of fixture rails for the pallet base of FIG. 1.

FIG. 10 shows the fixation rail 9. The fixation rail 9 can be are metallic and are extruded with a profile that allows for a nut, the head of a bolt or other adapter to slide the length of the rail 9. Two fixation rails 9 can be located along the long side of the pallet base 5 in some embodiments. Different adapters can be mounted on and slid along the rail 9 to allow fixation of various cargo to the pallet base 5. In some embodiments, the fixation rail 9 can include two opposing L-shaped flanges 9a and a fixation channel defined between the two L-shaped flanges 9a. In some embodiments, the fixation rail 9 can be shaped to receive an edge of the ramps 8 to store the ramps 8 in the fixation rail 9 during transport of the cargo.

Figure 17:
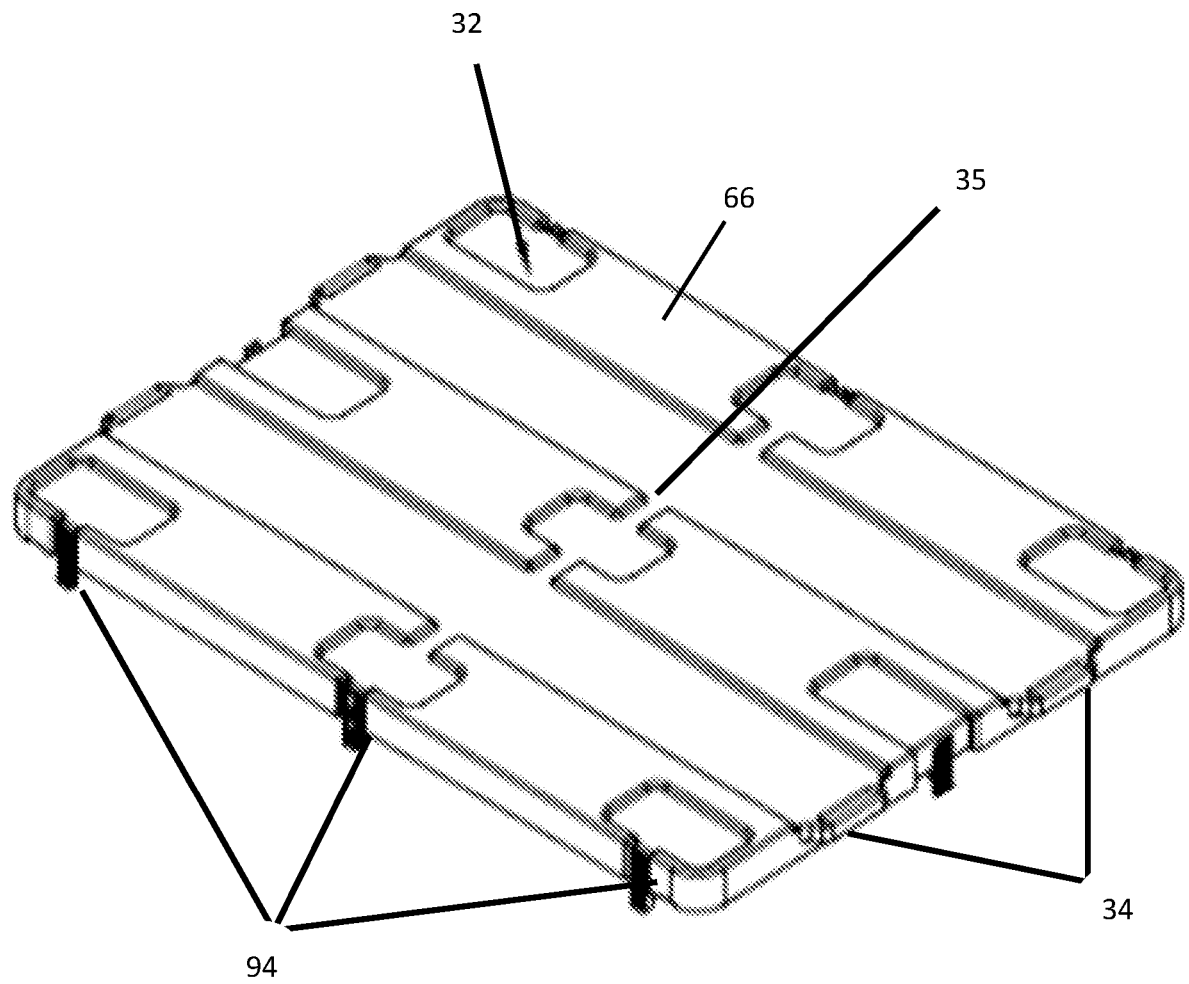
FIG. 17 is a perspective view of an embodiment of a lid and lid latch assemblies of a crate of the present disclosure.

The lid 66 is shown in FIG. 17 can include a large blow-molded shape that fits the top of two side walls below it and a plurality of latches 94 to keep the lid 66 connected to the enclosure frame. The top of the lid 66 has depressed areas 32 that correspond to the dimensions to the bottom of the risers on the pallet base 5 and allow the risers to nest in the depressed areas when stacking one crate on another. Each lid 66 can have a number of latches 94 on the long side and the short side that firmly fix the lid 66 to the side wall. The bottom edge of the lid 66 can also have cavities that correspond to the protrusions in the top of the side wall that allow the lid to nest onto the side wall and help reduce movement in the horizontal plane. The lid 66 can include lid handles 34 at each end of the lid 66 that allow for easier lifting and movement. The lid 66 also can have depressed areas 35 running through the middle and perpendicular to the long side that allow for straps to be put over the top and to nest in the depressed area 35 for helping to affix the lid 66 or strap one container to another.

Figure 19:
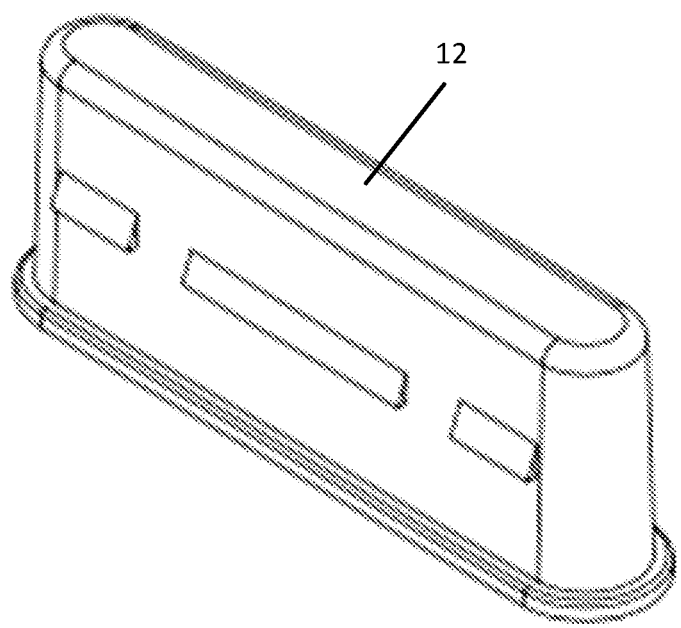
FIG. 19 is a perspective view of an exemplary rectangular guide protrusion ("teeth") for a crate of the present disclosure.

FIG. 19 shows an exemplary guide protrusion 12 that is inserted into the pallet surface to allow it to nest with the side wall above it when assembling the crate. The guide protrusions 12 can be an injection-molded part. The similar protrusions along the top edge of the side walls are cast in place when the side walls are molded as opposed to being inserted in the pallet base.

The crate is designed to be taken apart and shipped back in a collapsed form. FIG. 20 depicts a single tier crate disassembled and collapsed. The stacking order consists of a pallet base 5 with channels 7 on top. The ramps 9 can be flipped over and nested on top of the channels. Side wall assemblies 62a and 62b are removed from the pallet base 5 and are then folded at the corners and nested onto the nesting points 8c on the back of the ramps. Multiple side wall assemblies 62a and 62b can be stacked on top of each other with stacking protrusions 23 being received in or nested within stacking recesses 24 between subsequent side wall assemblies 62a and 62b. On the top, the lid 66 nests on the collapsed sidewalls. In some embodiments, the lid 66 may have a sufficient height such that the side wall assemblies 62a and 62 can fit within the lid 66 and latch components of the latch assemblies 94 on the lid 66 can engage corresponding latch components on the latch assemblies 92 on the pallet base 92 to secure the side wall assemblies 62a and 62b between the lid 66 and the pallet base 5 in a flat stored orientation.

Figure 21:
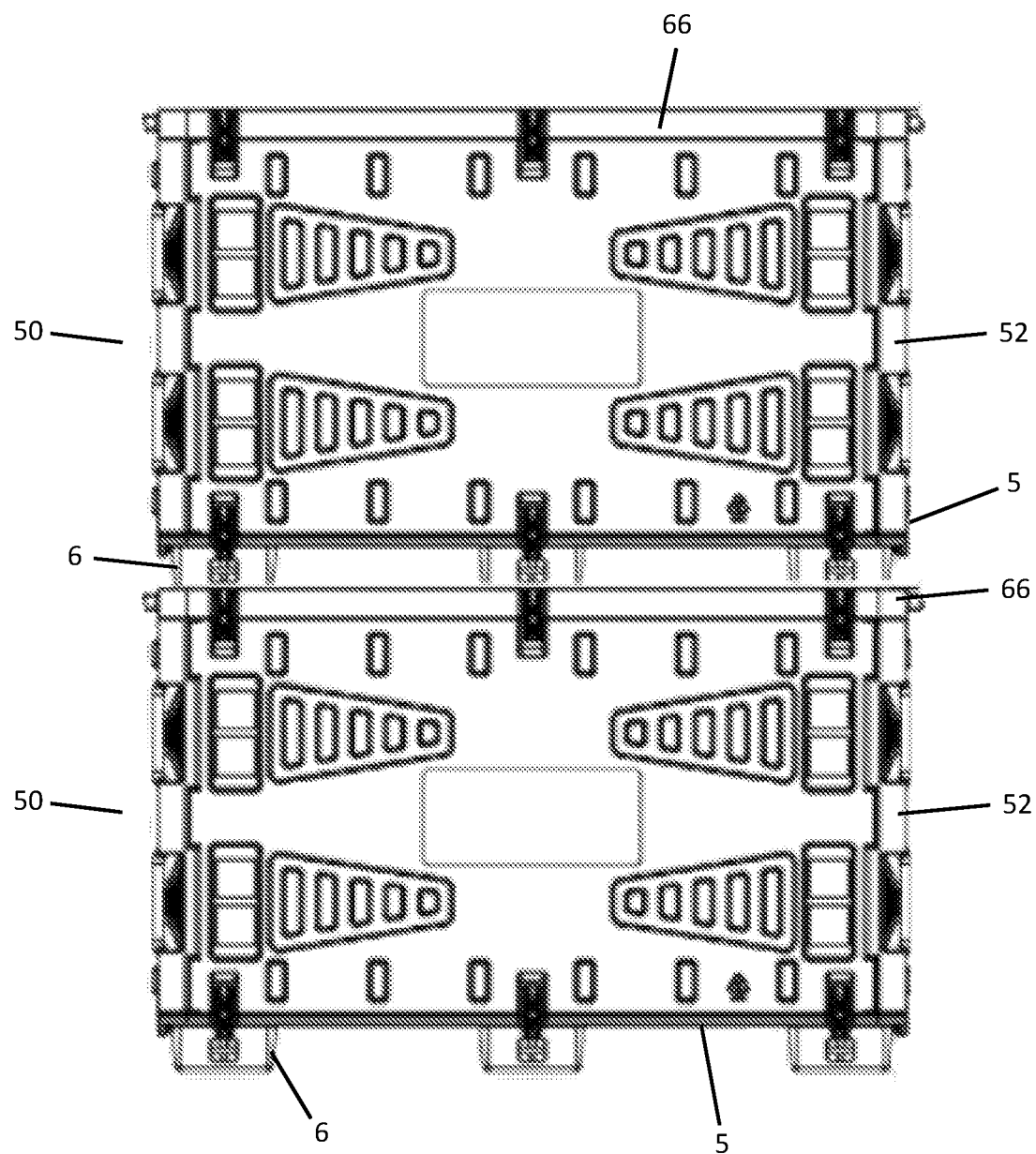
FIG. 21 is a front elevation view of two single-tier crates stacked on top of each other.

The basic unit for a standard server rack is three tiers tall, but can be utilized effectively using anywhere from one to four tiers attached to the base unit. A complete tier consists of two side wall assemblies put together on each side of the pallet base 5 or attached to the tier below it. FIG. 21 shows two single-tiered crates 50 stacked on top of one another.

Another aspect of the present disclosure is a method of shipping cargo including the steps of: at a first location, providing a crate having a pallet base, an enclosure frame, and a lid, the enclosure frame removably connected to the pallet base and the lid, the enclosure frame having one or more side walls pivotally connected to one another; placing the cargo in the crate; transporting the crate with the cargo to a desired location; unloading the cargo from the crate; removing the lid from the enclosure frame and removing the enclosure frame from the pallet base; folding the side walls of the enclosure frame onto one another to place the enclosure frame in a flat orientation; stacking the folded enclosure frame between the pallet base and the lid; and transporting the stacked crate back to the first location. In some embodiments, the crate further includes a tracking device disposed on the pallet base, the tracking device operable to track a location of the crate via a global positioning system, and the method further comprises tracking the location of the crate via the tracking device during transportation of the crate to and from the desired location.

Such a method can allow for the return and reuse of the modular shipping crates disclosed herein. After use and unloading of the cargo, the crate can be disassembled into a fraction of the volume of the assembled crate and then shipped back to a shipping vendor, where the crate can be readily reassembled and reused to ship additional products. Additional Bluetooth beacons can be placed in each component of the shipping crates and communicated with a tracking device so it can be readily determined if all components of a particular shipping crate have been returned together.

While various aspects of the present invention have been particularly shown and described with reference to the exemplary, non-limiting, embodiments above, it will be understood by those skilled in the art that various additional aspects and embodiments may be contemplated without departing from the spirit and scope of the present invention.

For example, a skilled artisan would understand that various materials can be used to construct the shipping crate as well as using various dimensions and configurations.

Other aspects, objects and advantages of the present invention can be obtained from a study of the drawings, the disclosure, and the claims.

What is claimed is:

1. A crate comprising:
a pallet base;
a pair of channels, each channel removably receivable on the pallet base, wherein the pair of channels are disposed in parallel;
a pair of ramps removably disposable on an edge of the pallet base such that the pair of channels and the pair of ramps are aligned with one another;
an enclosure frame, having
a first end and second end opposite the first end, the first end of the enclosure frame removably connectable to the pallet base to define a storage volume between the pallet base and the enclosure frame,
four side walls forming four corners on the enclosure frame when the first end of the enclosure frame is connected to the pallet base, and
at least one hinge assembly disposed on two adjacent side walls in one of the four corners, the at least one hinge assembly pivotally connecting the two adjacent side walls; and
a lid removably connectable to the second end of the enclosure frame.

2. The crate of claim 1, further comprising a first plurality of latch assemblies operable to removably connect the first end of the enclosure frame to the pallet base.

3. The crate of claim 2, further comprising a second plurality of latch assemblies operable to removably connect the second end of the enclosure frame to the lid.

4. The crate of claim 1, wherein:
when the enclosure frame is connected to the pallet base, the enclosure frame includes first and second side walls positioned opposite one another on the pallet base and third and fourth side walls positioned opposite one another on the pallet base;
each of the third and fourth side walls include
a first side wall portion pivotally connected to the first side wall, and
a second side wall portion pivotally connected to the second side wall;
the first and second side wall portions of the third side wall are disposed proximate the pair of ramps; and
the first and second side wall portions are removably connectable to one another when the enclosure frame is connected to the pallet base.

5. The crate of claim 4, further comprising:
at least one third side wall latch assembly operable to removably connect the first side wall portion and the second side wall portion on the third side wall together; and
at least one fourth side wall latch assembly operable to removably connect the first side wall portion and the second side wall portion on the fourth side wall together.

6. The crate of claim 1, wherein the four side walls comprise a first tier of side walls of the enclosure frame, and the enclosure frame further comprises a second tier of four side walls, the second tier of side walls removably connectable to the first tier of side walls, wherein the first tier of side walls defines the first end of the enclosure frame and is removably connectable to the pallet base and the second tier of side walls defines the second end of the enclosure frame and is removably connectable to the lid.

7. The crate of claim 1, wherein the four side walls comprise a first tier of side walls of the enclosure frame, and the enclosure frame further comprises:
a second tier of four side walls, the second tier of side walls removably connectable on top of the first tier of side walls; and
a third tier of four side walls, the third tier of side walls removably connectable on top of the second tier of side walls;
wherein the first tier of side walls defines the first end of the enclosure frame and is removably connectable to the pallet base and the third tier of side walls defines the second end of the enclosure frame and is removably connectable to the lid.

8. The crate of claim 1, further comprising a first set of guide recesses on the first end of the enclosure frame, and a first set of guide protrusions on the pallet base, each of the guide projections on the pallet base receivable in a corresponding guide recess defined in the first end of the enclosure frame to align the enclosure frame on the pallet base.

9. The crate of claim 8, further comprising a second set of guide recesses on the lid, and a second set of guide protrusions on the second end of the enclosure frame, each of the guide protrusions on the second end of the enclosure frame receivable in a corresponding guide recess defined in the lid to align the lid on the enclosure frame.

10. The crate of claim 1:
further comprising
a plurality of ramp apertures defined in the pallet base, and
a plurality of corresponding channel apertures aligned with the plurality of ramp apertures; and
wherein
each ramp of the pair of ramps includes a ramp end including at least one ramp tooth shaped to be received in a corresponding ramp aperture of the plurality of ramp apertures,
each channel of the pair of channels includes a channel end with at least one channel tooth shaped to be received in a corresponding channel aperture of the plurality of channel apertures, and
the ramp tooth of each ramp is removably disposable in one of the ramp apertures and the channel tooth of corresponding channels is removably disposable in a corresponding channel aperture such that the ramps and the corresponding channel are aligned with one another.

11. The crate of claim 10, wherein:
the ramps are rotatable on the pallet base via the at least one tooth of the ramp to rotate the ramp onto the corresponding channel.

12. The crate of claim 1, further comprising at least one fixation rail disposed on the pallet base, the fixation rail including two opposing L-shaped flanges and a fixation channel defined between the two L-shaped flanges.

13. The crate of claim 1, wherein the enclosure frame can be removed from the pallet base and the lid, and folded at the corners to place the enclosure frame in a flat orientation such that the enclosure frame can be stored between the lid and the pallet base.

14. The crate of claim 1, further comprising a tracking device disposed on the pallet base, the tracking device operable to monitor one or more of the following:
a temperature inside the crate;
a humidity inside the crate; and/or
a location of the crate via a global positioning system.

15. A crate comprising:
a pallet base;
a first tier of side walls removably connectable to the pallet base at a bottom end of the first tier, and a second tier of side walls removably connectable to a top end of the first tier, wherein each of the first tier and the second tier includes
a pair of side wall assemblies, each side wall assembly including
a side wall having a first side wall end and a second side wall end,
a first side wall portion pivotally connected to the first side wall end via a first hinge assembly disposed on the first side wall portion and the first side wall end, and
a second side wall portion pivotally connected to the second side wall end via a second hinge assembly disposed on the second side wall portion and the second side wall end,
wherein the first side wall portions of each side wall assembly are removably connectable to each other and the second side wall portions of each side wall assembly can be removably connected to each other to form an enclosure frame including the first side wall, the second side wall, a third side wall including the first side wall portions, and a fourth side wall including the second side wall portions, and
wherein an interior space formed by the enclosures of the pair of side wall assemblies of the first tier and the second tier are free of a dividing pallet base or lid; and
a lid removably connectable to the top end of the second tier.

16. The crate of claim 15, further comprising:
a first side wall latch assembly operable to removably connect the first side wall portions of the third side wall together;
a second side wall latch assembly operable to removably connect the second side wall portions of the fourth side wall together; and
a plurality of pallet base latch assemblies operable to connect a first end of the enclosure frame to the pallet base;
wherein the first and second side wall latch assemblies are oriented in a horizontal direction and the plurality of pallet base latch assemblies are oriented in a vertical direction when the first end of the enclosure frame is connected to the pallet base and the enclosure frame is positioned on top of the pallet base.

17. The crate of claim 15, wherein each of the first and second side wall portions further comprises:
an outer surface,
a handle recess defined in the outer surface; and
a handle spanning the handle recess such that the handle is substantially flush with the outer surface.

18. The crate of claim 15, wherein the first and second side wall portions of each of the side wall assemblies can be folded onto the side wall such that the side wall assemblies can be stacked between the pallet base and the lid for storing the crate when not in use.

19. A method of shipping cargo comprising:
at a first location, providing a crate having a pallet base, a pair of removable channels, a pair of ramps, an enclosure frame, and a lid, the enclosure frame removably connected to the pallet base and the lid, the enclosure frame having one or more side walls pivotally connected to one another via a hinge assembly disposed on two adjacent side walls;
placing the cargo in the crate via the pair of ramps and the pair of channels;
transporting the crate with the cargo to a desired location;
unloading the cargo from the crate via the pair of channels and the pair of ramps;
removing the lid from the enclosure frame and removing the enclosure frame from the pallet base;
folding the side walls of the enclosure frame onto one another to place the enclosure frame in a flat orientation;
stacking the folded enclosure frame between the pallet base and the lid; and
transporting the stacked crate back to the first location.

20. The method of claim 19, wherein the crate further includes a tracking device disposed on the pallet base, the tracking device operable to track a location of the crate via a global positioning system, and the method further comprises tracking the location of the crate via the tracking device during transportation of the crate to and from the desired location.

* * * * *